US010226842B2

(12) United States Patent
Lavalley et al.

(10) Patent No.: US 10,226,842 B2
(45) Date of Patent: Mar. 12, 2019

(54) POSITION ADJUSTABLE GRAPPLE ATTACHMENT

(71) Applicant: LAVALLEY INDUSTRIES, LLC, Bemidji, MN (US)

(72) Inventors: Jason Lavalley, Bemidji, MN (US); Daniel Larson, Bagley, MN (US); Jesse Kilde, Blackduck, MN (US)

(73) Assignee: LaValley Industries, LLC, Bemidji, MN (US)

( * ) Notice: Subject to any disclaimer, the term of this patent is extended or adjusted under 35 U.S.C. 154(b) by 379 days.

(21) Appl. No.: 15/239,237

(22) Filed: Aug. 17, 2016

(65) Prior Publication Data
US 2016/0354875 A1 Dec. 8, 2016

Related U.S. Application Data

(60) Continuation of application No. 14/060,842, filed on Oct. 23, 2013, now Pat. No. 9,452,497, which is a
(Continued)

(51) Int. Cl.
*B23P 11/00* (2006.01)
*B23K 37/053* (2006.01)
(Continued)

(52) U.S. Cl.
CPC ........ *B23K 37/0533* (2013.01); *B23K 31/027* (2013.01); *B23P 11/00* (2013.01);
(Continued)

(58) Field of Classification Search
CPC ......... B23P 11/00; B23P 11/005; B23P 17/00; B23P 19/00
See application file for complete search history.

(56) References Cited

U.S. PATENT DOCUMENTS 3,231,303 A  1/1966  LeTourneau
3,561,615 A  2/1971  Forsberg et al.
(Continued)

FOREIGN PATENT DOCUMENTS

CA     2641321     4/2009
CN   101423176    5/2009
(Continued)

OTHER PUBLICATIONS

Australian Office Action issued in the corresponding Australian Patent Application No. 2012219411, dated Mar. 18, 2016, 5 pages.
(Continued)

*Primary Examiner* — Lee D Wilson
(74) *Attorney, Agent, or Firm* — Hamre, Schumann, Mueller & Larson, P.C.

(57) ABSTRACT

An attachment that is configured for attachment to an arm of a piece of construction equipment. The attachment includes a pair of grapple mechanisms mounted on a main beam. Each grapple mechanism includes opposing grab arms mounted to a grab arm housing. The grab arm housings of the grapple mechanisms are each individually adjustable separate from one another relative to the main beam in one or more directions generally perpendicular to the longitudinal axis of the main beam. The attachment can fine adjust the positions of the pipe ends relative to one another until the ends align with each other, at which point the pipe ends can be welded or otherwise secured to each other while being held in position by the grapple mechanisms.

7 Claims, 21 Drawing Sheets

Related U.S. Application Data continuation of application No. 13/673,004, filed on Nov. 9, 2012, now Pat. No. 8,590,769, which is a division of application No. 13/398,995, filed on Feb. 17, 2012, now Pat. No. 8,328,071.

(60) Provisional application No. 61/443,737, filed on Feb. 17, 2011, provisional application No. 61/599,164, filed on Feb. 15, 2012.

(51) Int. Cl.
  B26D 3/16 (2006.01)
  B26D 7/02 (2006.01)
  B66C 1/10 (2006.01)
  B66C 1/42 (2006.01)
  B23K 31/02 (2006.01)
  B23K 101/06 (2006.01)

(52) U.S. Cl.
  CPC .............. B26D 3/16 (2013.01); B26D 7/02 (2013.01); B66C 1/10 (2013.01); B66C 1/427 (2013.01); B23K 2101/06 (2018.08); Y10T 29/49885 (2015.01); Y10T 29/49902 (2015.01); Y10T 29/49998 (2015.01); Y10T 29/53983 (2015.01); Y10T 29/53991 (2015.01); Y10T 83/0596 (2015.04); Y10T 83/7487 (2015.04)

(56) References Cited

U.S. PATENT DOCUMENTS

| | | | |
|---|---|---|---|
| 3,719,296 A | 3/1973 | Larson, Jr. | |
| 3,727,653 A | 4/1973 | Tucek | |
| 4,035,010 A | 7/1977 | Kawashita et al. | |
| 4,486,136 A | 12/1984 | Howard | |
| 4,810,019 A | 3/1989 | Brucher | |
| 4,858,979 A | 8/1989 | Parma | |
| 5,219,265 A | 6/1993 | Recker | |
| 5,607,251 A | 3/1997 | Rafn | |
| 5,975,604 A | 11/1999 | Wolin et al. | |
| 6,024,145 A | 2/2000 | Ackles | |
| 6,052,911 A | 4/2000 | Davis | |
| 6,176,531 B1 | 1/2001 | Wheeler | |
| 6,220,807 B1 | 4/2001 | Sorokan | |
| 6,280,119 B1 | 8/2001 | Ryan et al. | |
| 7,066,076 B2 | 6/2006 | Roy et al. | |
| 7,357,163 B2 | 4/2008 | Wager | |
| 8,313,016 B2 | 11/2012 | Dagenais | |
| 8,328,071 B2* | 12/2012 | LaValley | B26D 3/16 228/49.3 |
| 8,590,769 B2* | 11/2013 | LaValley | B26D 3/16 228/212 |
| 8,642,914 B2 | 2/2014 | Dupont et al. | |
| 8,695,198 B2 | 4/2014 | Dagenais | |
| 8,777,201 B2 | 7/2014 | Dagenais | |
| 9,073,732 B2* | 7/2015 | LaValley | B66C 1/44 |
| 9,452,497 B2* | 9/2016 | Lavalley | B26D 3/16 |
| 2007/0013199 A1 | 1/2007 | Hall et al. | |
| 2007/0166144 A1 | 7/2007 | Hall | |
| 2008/0029578 A1 | 2/2008 | Steel et al. | |
| 2009/0057019 A1* | 3/2009 | LaValley | E21B 19/14 175/85 |
| 2009/0155040 A1* | 6/2009 | Martin | B66C 1/427 414/744.8 |
| 2010/0149178 A1 | 6/2010 | Yokoyama et al. | |
| 2010/0308609 A1 | 12/2010 | LaValley et al. | |
| 2011/0079584 A1 | 4/2011 | Flees | |
| 2012/0074631 A1 | 3/2012 | Dagenais | |
| 2012/0213937 A1* | 8/2012 | LaValley | B26D 3/16 118/503 |
| 2013/0068387 A1* | 3/2013 | LaValley | B26D 3/16 156/304.2 |
| 2013/0212852 A1 | 8/2013 | Dagenais | |
| 2013/0264761 A1 | 10/2013 | Dagenais | |
| 2014/0013579 A1 | 1/2014 | Dagenais | |
| 2014/0042207 A1* | 2/2014 | LaValley | B26D 3/16 228/44.5 |
| 2016/0354875 A1* | 12/2016 | LaValley | B26D 3/16 |

FOREIGN PATENT DOCUMENTS

| | | |
|---|---|---|
| DE | 29502091 | 4/1995 |
| DE | 10206645 | 8/2003 |
| EP | 1703187 | 9/2006 |
| EP | 1870372 | 12/2007 |
| FI | 941990 | 10/1995 |
| JP | 07-315758 | 12/1995 |
| WO | 200053522 | 9/2000 |
| WO | 0065193 | 11/2000 |
| WO | 2003082725 | 10/2003 |
| WO | 2006112689 | 10/2006 |
| WO | 2007097698 | 8/2007 |
| WO | 2008076067 | 6/2008 |
| WO | 2009029879 | 3/2009 |

OTHER PUBLICATIONS

English translation of First Office Action for Chinese Application No. 2012800080221, dated Sep. 26, 2014, 14 pages.
European Search Report for application No. 12746955.9 dated Dec. 5, 2013, 4 pages.
Indexator Rototilt® print outs from www.indexatornorthamerica.com/index.php, printed on Sep. 8, 2011; 10 pages.
Prentice Grapples specification sheet; printed Sep. 8, 2011 from http://prenticecranes.com/prentice-grapples.html; 6 sheets.
Prentice 2410-2414 Knuckleboom Loaders; printed Sep. 8, 2011 from http://prenticecranes.com/prentice-2410-2414-knuckleboom-loaders.html; 6 sheets.
"Manipulator KM 930," Kinshofer GmbH, available at http://www.kinshofer.com/site_eng/produkte_main/main_km930.html; printed May 13, 2010; 1 page.
"Manipulator KM 930," Kinshofer Gmbh, available at http://www.kinshofer.com/site_eng/produkte_main/Resources/KM_930_eng.pdf ; printed May 13, 2010; 1 page.
"Selling GB Wood Grapple products," GB Industries Co. Ltd, available at http://kennycho.trustpass.alibaba.com/product/107764499-11334694/Selling_GB_Wood_Grapple_products_html ; printed May 13, 2010; 3 pages.
"Selector/Demolition Grabs," McQuaid Engineering Ltd, available at http://www.alibaba.com/product/mcquaid84-215959236-0/Selector_Demolition-Grabs.html ; printed May 13, 2010; 3 pages.
"Kinshofer Manipulators—Kinshofer-KM930," available at http://www.worktruck-outfitters.com/kinshofer-manipulators-p-1281.html ; printed May 13, 2010; 4 pages.
Drawings and Photographs of a Grapple manufactured by Weldco Beales Mfg.; in Applicants possession on or about Mar. 20, 2010; 15 pages.
Pictures of a grapple mechanism printed from http://rotobec.com/web/2610_PH_Pipe_and_Pole-Handler.html and http://rotobec.com/resources/images/products/rotations/RGP-252_main.jpg on Mar. 30, 2010, but possibly posted on the Internet as early as Sep. 2009; 2 pages.
Five photographs taken in Jan. 2010 of a grapple mechanism used by Michels Corporation.
Photograph of Manipulator manufactured by Kinshofer GmbH of Germany (1 page).
Drawings of Heavy Duty Pole Claw manufactured by EZ-Spot-UR, dated Apr. 29, 2010, found online at http://www.ezspotur.com/HDPC-01-0006_NO_SETBACK.pdf (1 page).

* cited by examiner

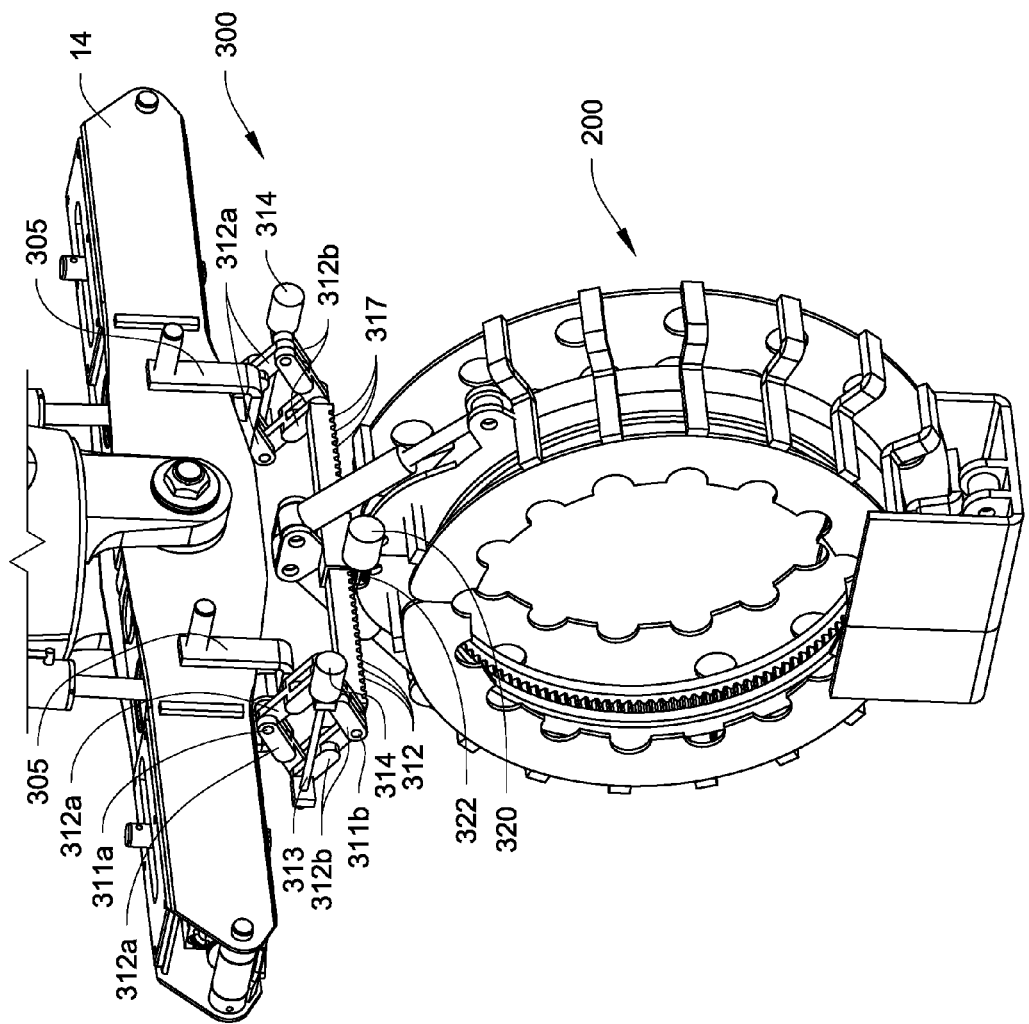

POSITION ADJUSTABLE GRAPPLE ATTACHMENT

This application claims the benefit of U.S. Provisional Applicant Ser. No. 61/599,164, filed on Feb. 15, 2012 and claims the benefit of U.S. Provisional Applicant Ser. No. 61/443,737, filed on Feb. 17, 2011, and the entire contents of both applications are incorporated herein by reference.

FIELD

This disclosure relates to an attachment that is attachable to, for example, a trackhoe, backhoe, excavator or other piece of construction equipment for use in, for example, positioning pipe ends to join the pipe ends together.

BACKGROUND

Positioning two large diameter pipes, such as oilfield pipes, for tie-in is extremely time consuming and can take many hours and require many workers and millions of dollars worth of equipment which is very costly and slows down the production of the pipeline. In addition, the current process is hazardous to the workers. Any reduction in the time and cost it takes to make a tie-in connection is beneficial. In addition, improving the safety to ground workers would be beneficial.

SUMMARY

An attachment is described that is configured for attachment to an arm of a piece of construction equipment, for example an excavator, a trackhoe, backhoe or the like. The attachment is configured to automate the process of aligning pipe ends during pipe tie-in. The attachment can fine adjust the positions of the pipe ends relative to one another in x, y and z-axis directions until the ends align with each other, at which point the pipe ends can be welded or otherwise secured to each other, and/or processed in other manners, other while being held in position by the grapple mechanisms. The attachment is configured to leave room for a pipe processing tool, for example a welding apparatus, to perform a processing operation on one or more of the pipes, such as welding the pipe ends together.

The attachment is designed to grab the ends of two separate pipes that are going to be aligned end to end for connecting of the pipes through welding or other suitable connection means. The attachment is configured to pull the two pipes together in the Z-axis direction and also aligns them concentric to each other via independent movement in the X-axis and Y-axis directions.

As used throughout the specification and claims, the word pipe or the like, unless otherwise specified, is intended to encompass all types, shapes, and sizes of pipe that need to be laid and tied-in with other sections of pipe. The pipe can be made of any type of material including, but not limited to, metal or plastic. In cross-section, the pipe can be round, square, triangular, or have other cross-sectional shapes. In some embodiments, an end of one pipe can be connected to a device, other than another pipe end, that may be connected to the pipe, for example a valve, through which fluid can flow. Therefore, the term pipe is intended to encompass any structure through which fluid is intended to flow.

In addition, in some embodiment, the attachment can be used to grab, manipulate and process a single section of pipe. The attachment may also be used to grab, manipulate and process objects other than pipe, for example trees, logs, telephone poles, and the like.

In one embodiment, a mechanism comprises a pair of grapple mechanisms mounted on a main beam. Each grapple mechanism includes opposing grab arms mounted to a grab arm housing. The grab arms of at least one of the grapple mechanisms are adjustable together relative to the main beam in one or more directions generally perpendicular to a longitudinal axis of the main beam to adjust the position of the grab arms of the at least one grapple mechanism relative to the main beam.

In one embodiment, it is the grab arm housings of the grapple mechanisms that are each individually adjustable separate from one another relative to the main beam in one or more directions generally perpendicular to the longitudinal axis of the main beam. Because the grab arms are mounted to the grab arm housings, the grab arms which grip the pipe ends move with the grab arm housings.

Each grapple mechanism grabs a respective pipe section near the pipe ends using the grab arms. Once the pipe sections are being held by the grab arms, the grab arm housings are adjusted relative to the main beam which adjusts the positions of the pipe ends that are held by the grab arms. The grab arm housings are adjusted until the pipe ends align, at which point the pipe ends can be secured together in a conventional manner.

The grab arm housing can be adjustable in multiple directions generally perpendicular to the longitudinal axis of the main beam. For example, when viewing the grab arm housing in side plan view, the grab arm housing is adjustable in left and right directions and/or up and down directions relative to the main beam.

For each grapple mechanism, the grab arms can be actuated by an actuating cylinder connected to one of the grab arms and a timing link interconnecting the grab arms. Alternatively, each grab arm can be actuated by an actuating cylinder connected thereto.

A laser or other automatic alignment system can be used to facilitate alignment of the pipe ends.

The main beam of the attachment is also adjustable in position via rotation about a vertical axis and tilting about a horizontal axis. The grab arm housings are also adjustable in directions parallel to the longitudinal axis of the main beam as described in US 2010/0308609 which is incorporated herein by reference in its entirety. These adjustments of the main beam and the grab arm housings, together with the adjustments of the grab arm housings relative to the main in one or more directions generally perpendicular to the longitudinal axis of the main beam, permit precise positioning of the grapple mechanisms to grab the pipe ends.

In another example, an attachment is provided that is attachable to an arm of construction equipment for use in positioning the ends of two pipes to join the pipe ends together. The attachment includes a mount bracket that is configured to be connectable to the of the construction equipment. A lower head assembly is rotatably mounted to the mount bracket to permit the lower head assembly to rotate relative to the mount bracket about a first axis. A main beam pivotally mounts to the lower head assembly so that the main beam can pivot relative to the lower head assembly about a second axis that is substantially perpendicular to the first axis. A pair of grapple mechanisms are mounted on the main beam, with each grapple mechanism including opposing grab arms mounted to a grab arm housing. Each of the grab arm housings of the grapple mechanisms and the main beam are adjustable relative to each other in two directions generally perpendicular to a longitudinal axis of the main beam to adjust the relative positions of the grab arm housings and the main beam. The longitudinal axis of the main beam is substantially perpendicular to the first axis and to the second axis, and the grab arms are actuatable between a closed position gripping the two pipes and an open position. In addition, each grab arm housing and the main beam are adjustable relative to each other in a direction parallel to the longitudinal axis of the main beam. Adjustment is also provided by first and second tilt actuators, with each tilt actuator having a first end attached to the lower head assembly and a second end attached to the main beam.

Although the preceding paragraph mentions a pair of grapple mechanisms, it is possible that more than two grapple mechanisms can be used. For example, three or more grapple mechanisms could be mounted on the main beam. Not all of the grapple mechanisms need be adjustable in the manner described depending on the intended function of the grapple mechanism.

An example of a pipe tie-in method includes grabbing the end of a first pipe using a first grapple mechanism mounted on a main beam, and grabbing the end of a second pipe using a second grapple mechanism mounted on the main beam. The end of the first pipe is then aligned with the end of the second pipe by adjusting the relative positions of the beam and at least one of the first and second grapple mechanisms in one or more directions generally perpendicular to a longitudinal axis of the main beam.

The described attachment improves the accuracy and the quickness that two pipes can be aligned for attachment through at least the following ways.

a) The arm linkage design helps to ensure that the pipes are always centered on the arm housing helping to align the two pipes when they are pulled together by the shift cylinders in the z-axis direction.

b) The operator of the construction equipment can independently move each arm housing relative to the main beam in the x, y or z axis directions. The arm housings are shiftable along the longitudinal axis of the main beam in the z-axis direction. In addition, the arm housings are shiftable up and down relative to the main beam in the x-axis and y-axis directions.

c) Ground personnel can also use a remote control device from the ground to shift the arm housings in the various directions during alignment of the two pipe ends. It is also possible that the remote control device could be used to control any other movements that may be appropriate to achieve alignment, such as pivoting of the main beam and swiveling of the lower head assembly, and possibly movements of the arm of the construction equipment.

d) The grab arms can be opened or closed independently of each other. In addition, a large range of pipe diameters can be lifted by the disclosed grab arms.

e) A guidance system can be used to automatically align the two pipe ends to each other. The guidance system can utilize contact-type position sensors or non-contact type position sensors. Contact type sensors include Linear Variable Differential Transformers (LVDT) or Rotary Variable Differential Transformers (RVDT). Non-contact type sensors include one or more lasers.

In one embodiment, the guidance system can be a laser guidance system that employs one line laser attached to a linear actuator that has position feedback. Actuators, such as linear actuators, move the laser across the two pipe ends and captures a full 3-dimensional image which indicates the curvatures of the two pipe ends with respect to each other. Through suitable processing of the curvature data, it can be determined that the pipe ends are aligned in the x, y and z directions and determined that the pipes are parallel to each other.

DRAWINGS

Figure 8A:
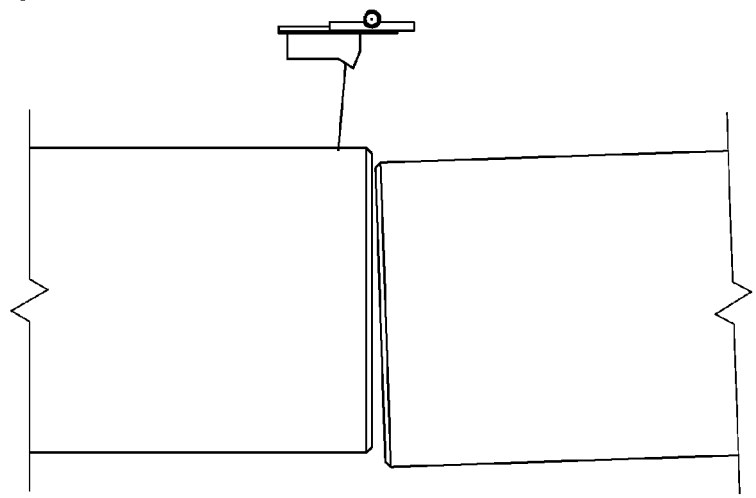
Figure 8B:
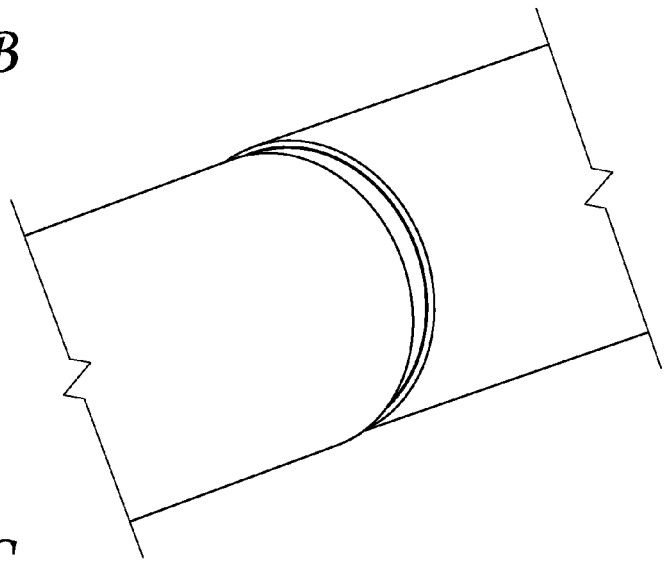
Figure 8C:
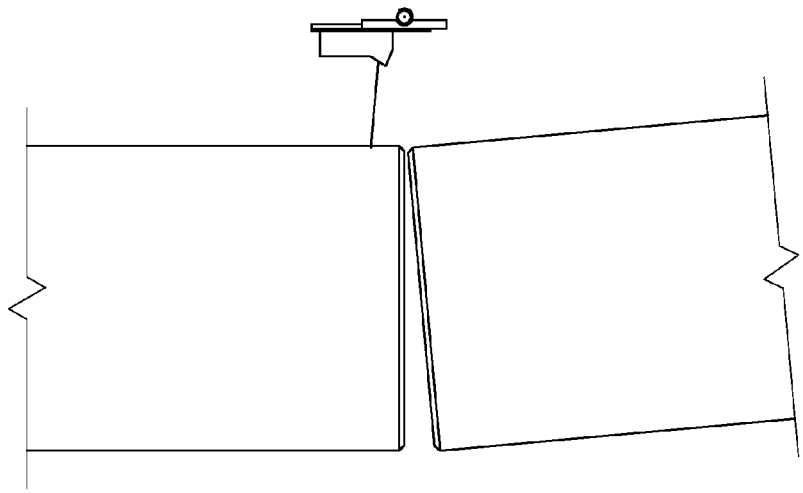

FIGS. 8A-C illustrate examples of different types of misalignment between pipe ends.

Figure 9:
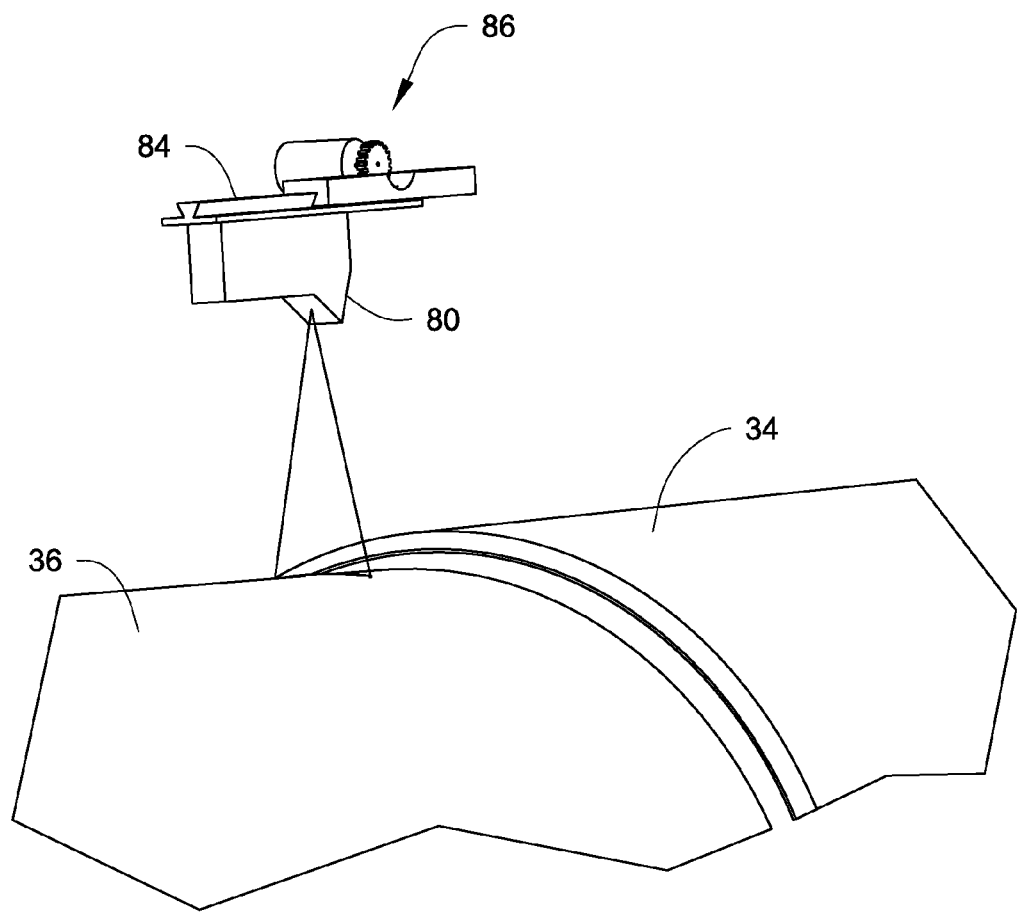

FIG. 9 illustrates a single laser guidance system.

Figure 10A:
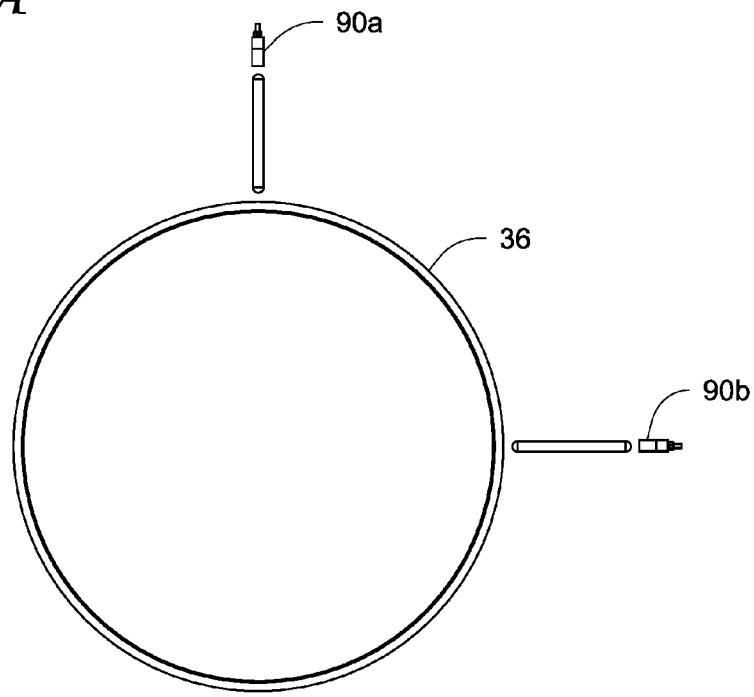
Figure 10B:
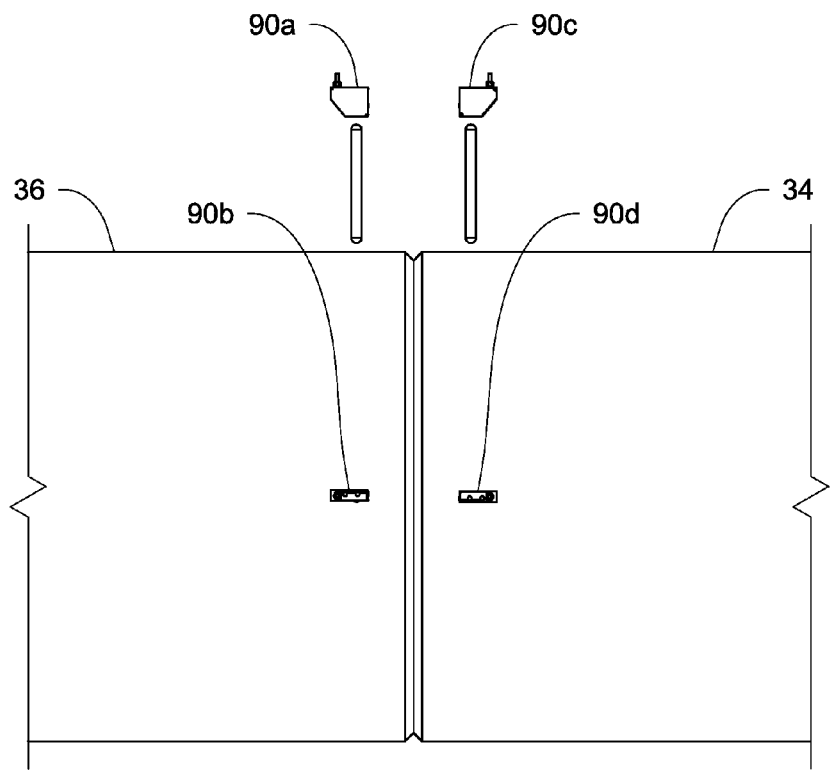

FIGS. 10A-B illustrate a four laser guidance system.

Figure 11:
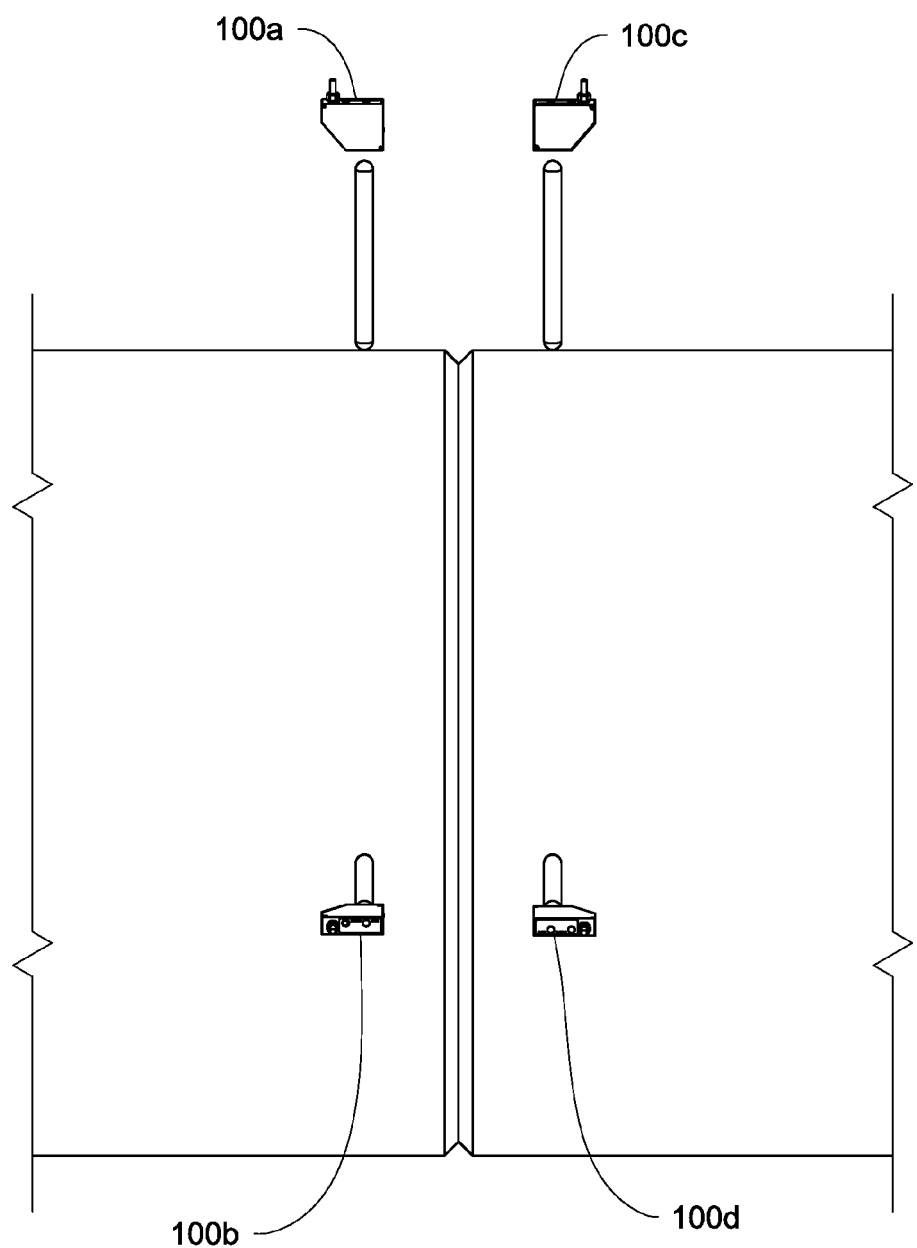

FIG. 11 illustrates an LVDT guidance system.

Figure 12A:
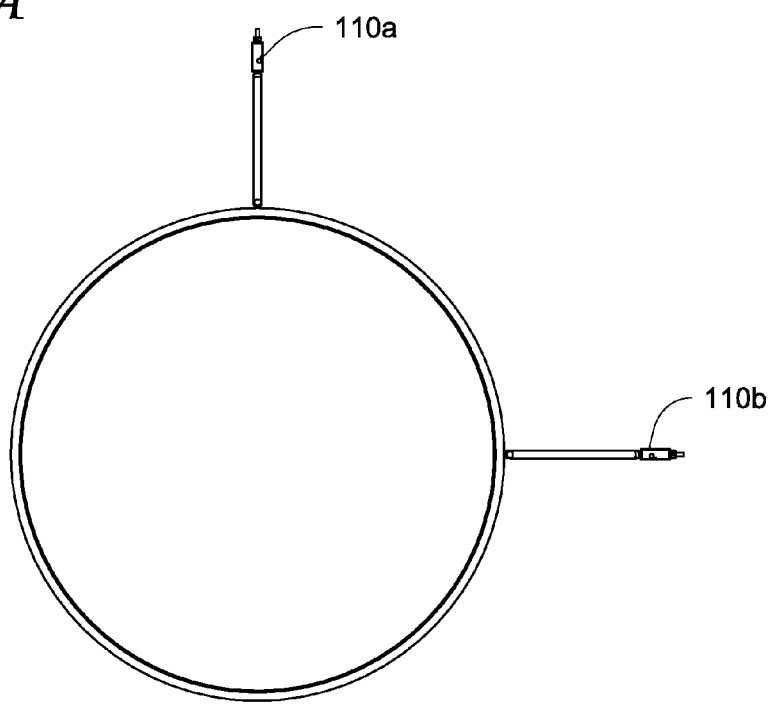
Figure 12B:
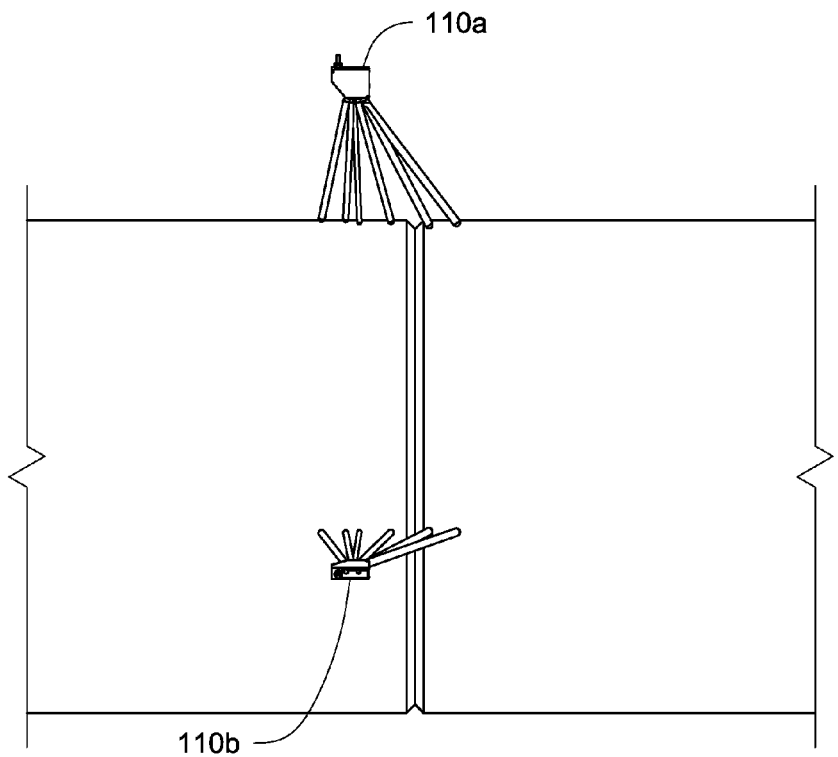

FIGS. 12A-B illustrate a two laser guidance system.

Figure 13:
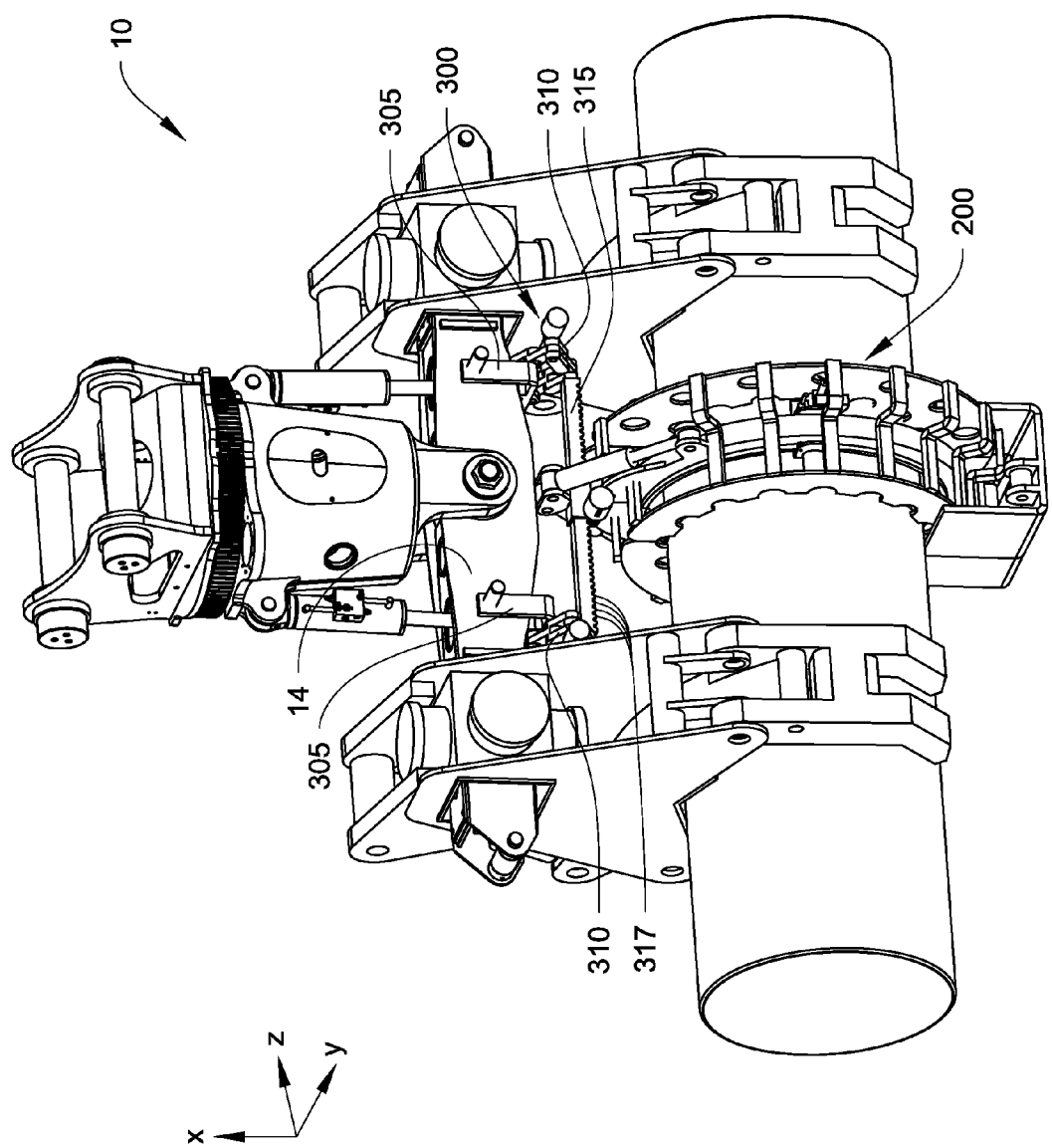

FIG. 13 illustrates an isometric perspective view of a pipe processing tool mounted onto the attachment using a first embodiment of a mounting mechanism.

Figure 14:
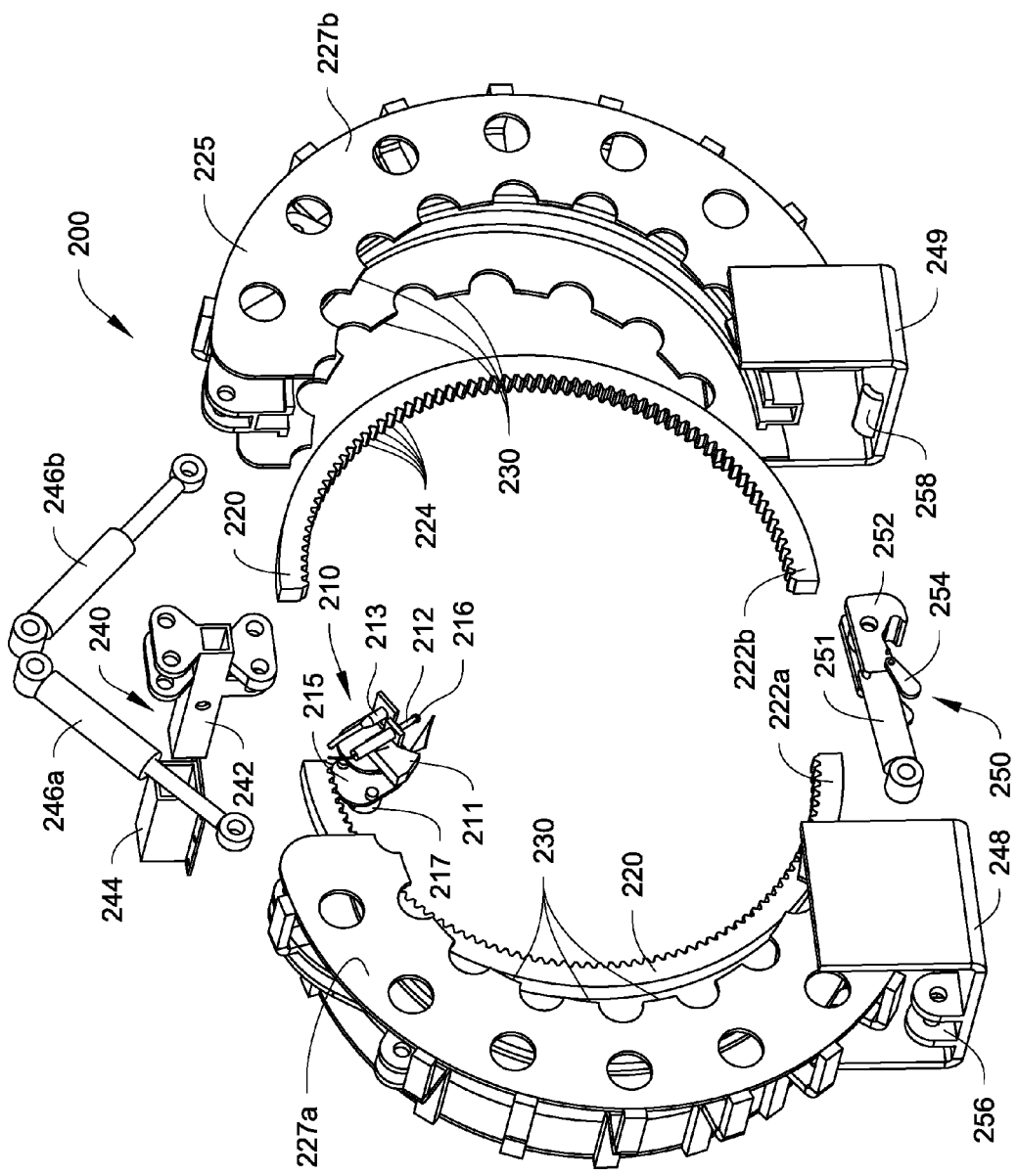

FIG. 14 illustrates an exploded view of the pipe processing tool shown in FIG. 13.

Figure 15:
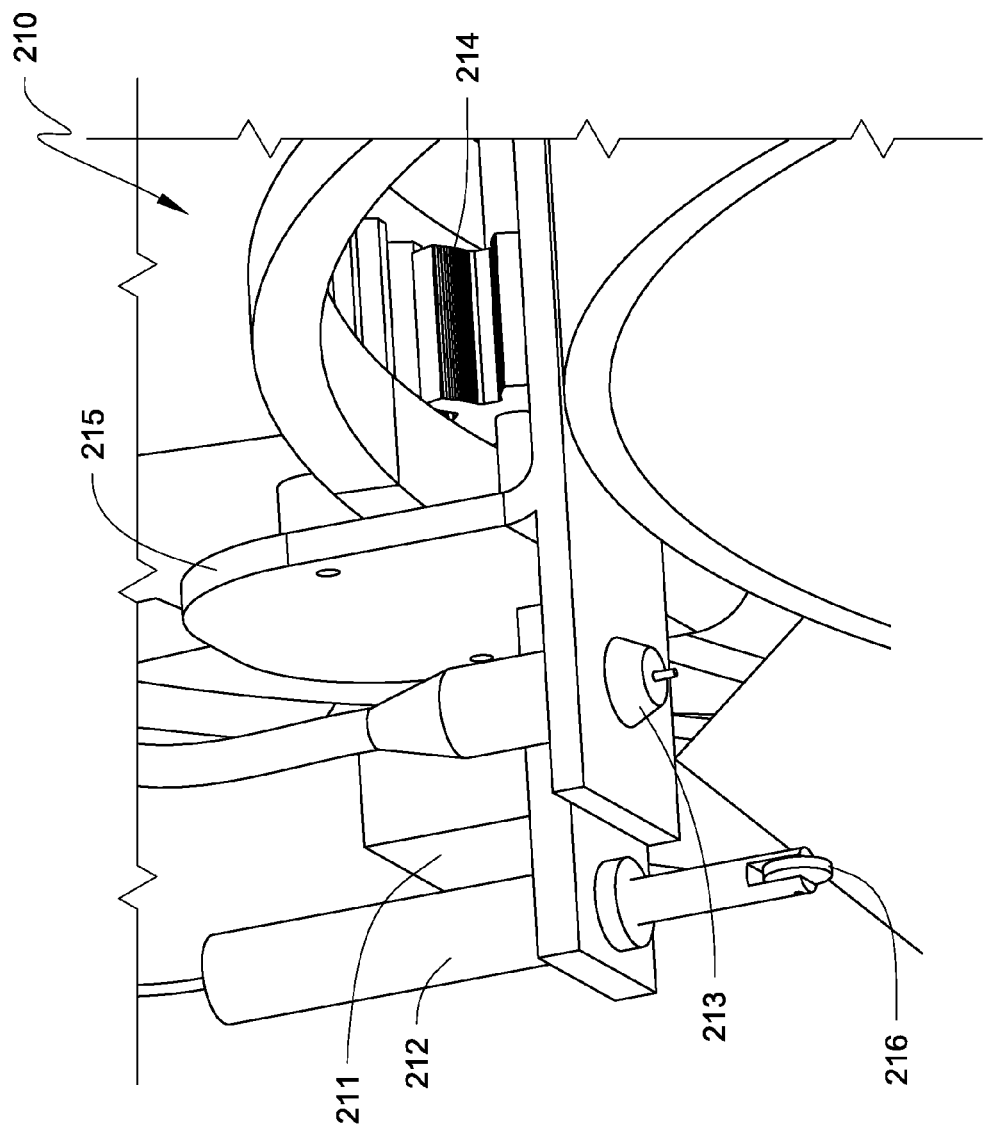

FIG. 15 illustrates a zoomed in view of the welding unit shown in FIG. 14.

Figure 16:
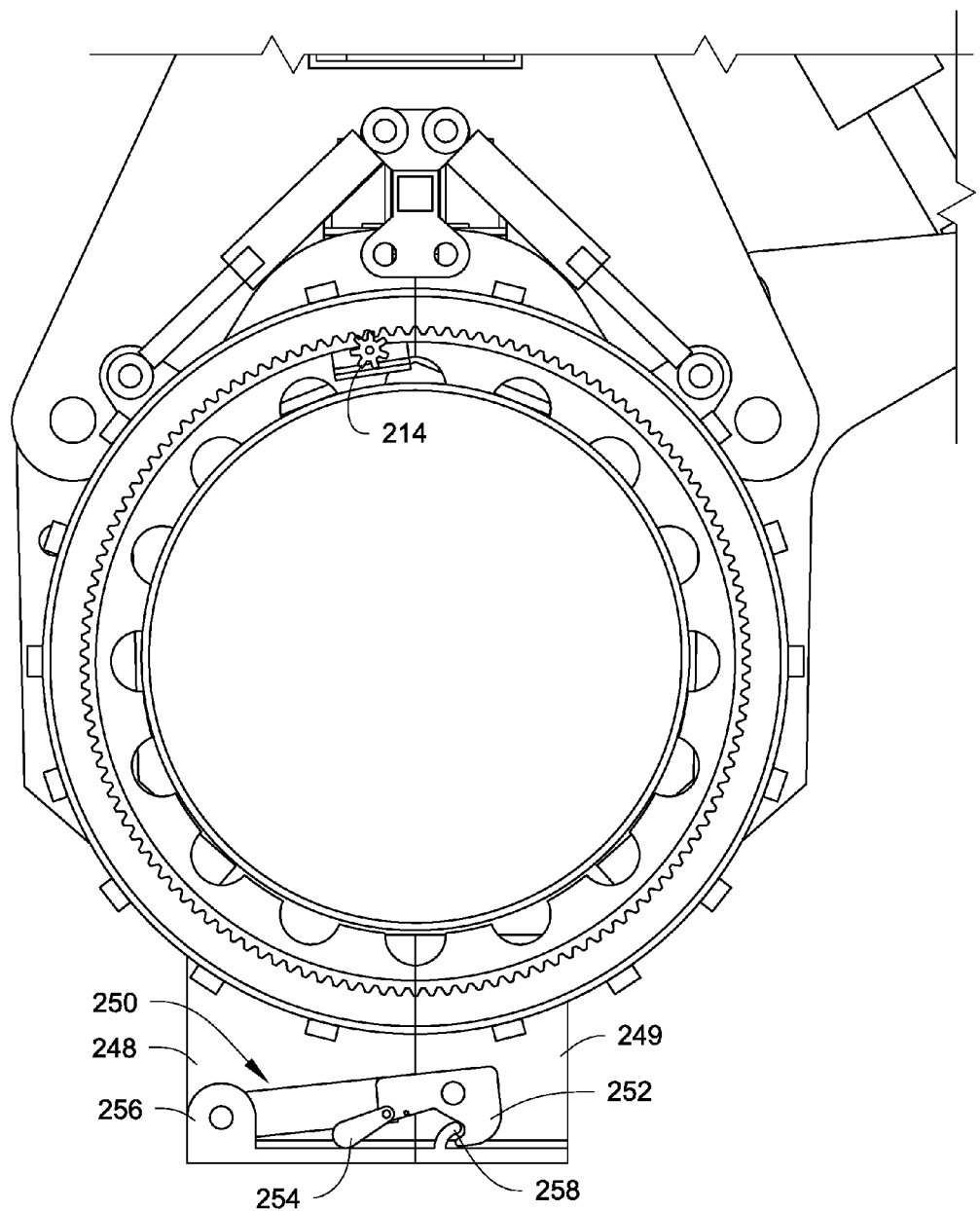

FIG. 16 illustrates a cross-sectional end view of the pipe processing tool shown in FIG. 13.

FIG. 17 illustrates an isometric view of the mounting mechanism for mounting the pipe processing tool onto the main beam of the attachment.

Figure 18A:
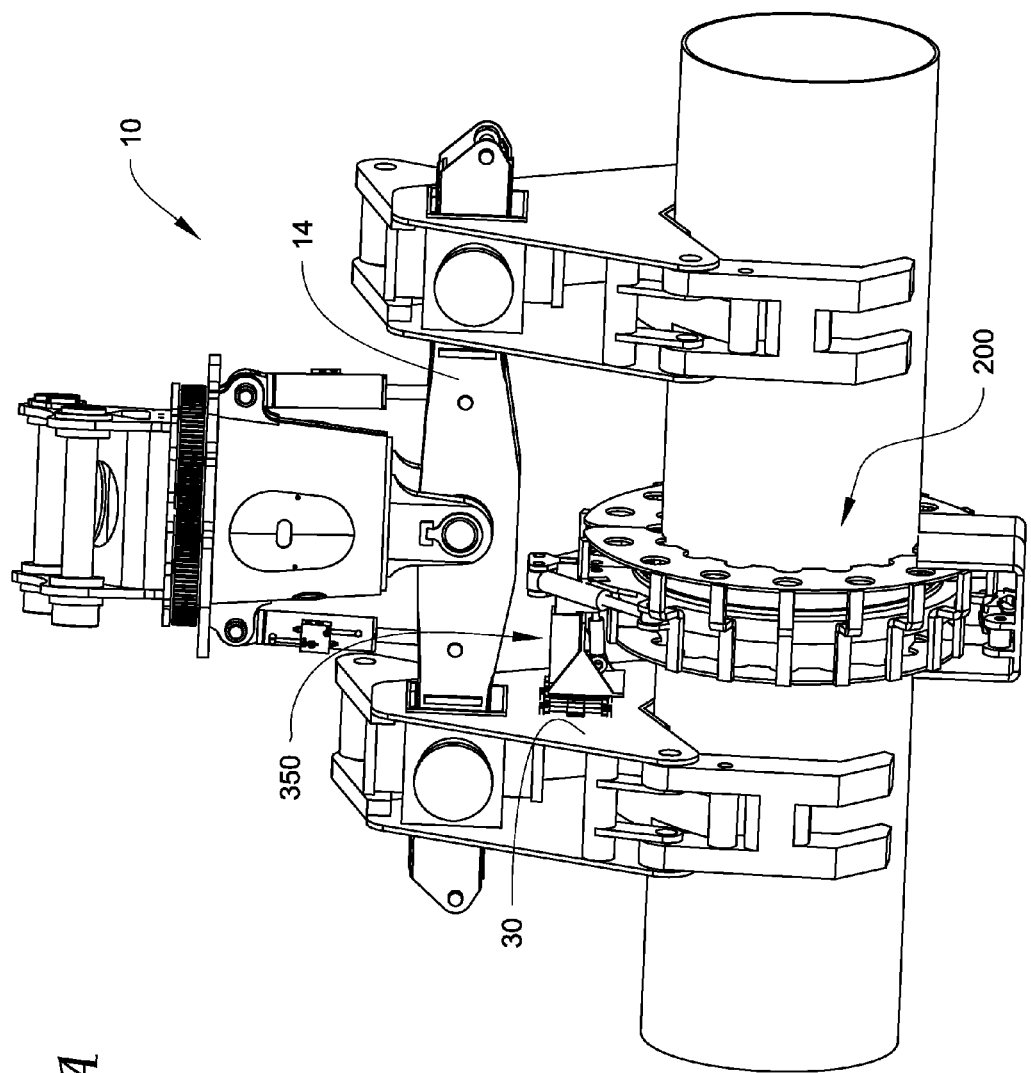

FIG. 18A illustrates an isometric perspective view of the pipe processing tool in a closed position and mounted onto the attachment using a second embodiment of a mounting mechanism.

Figure 18B:
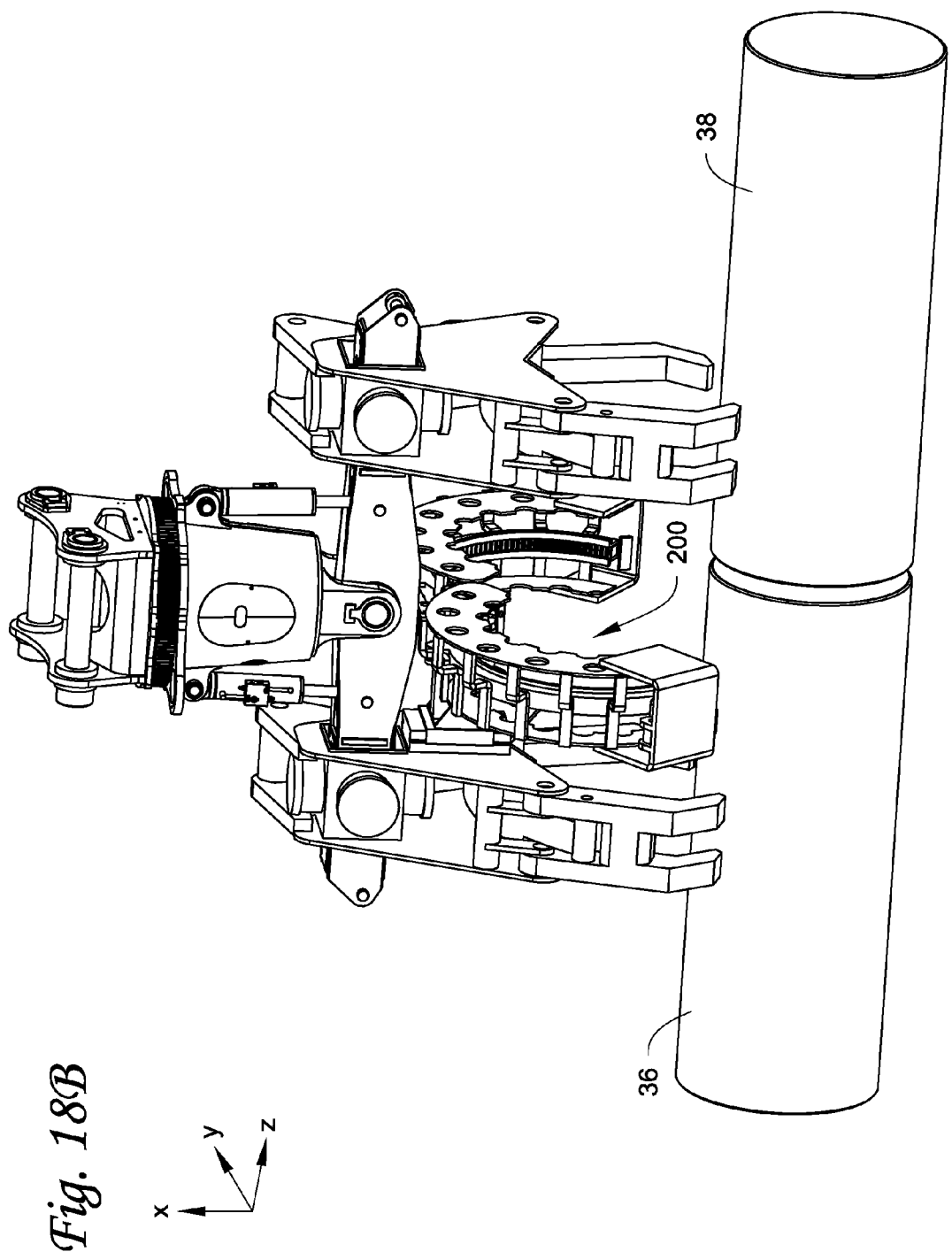

FIG. 18B illustrates an isometric perspective view of the pipe processing tool in an open position and mounted onto the attachment using the second embodiment of the mounting mechanism.

Figure 19:
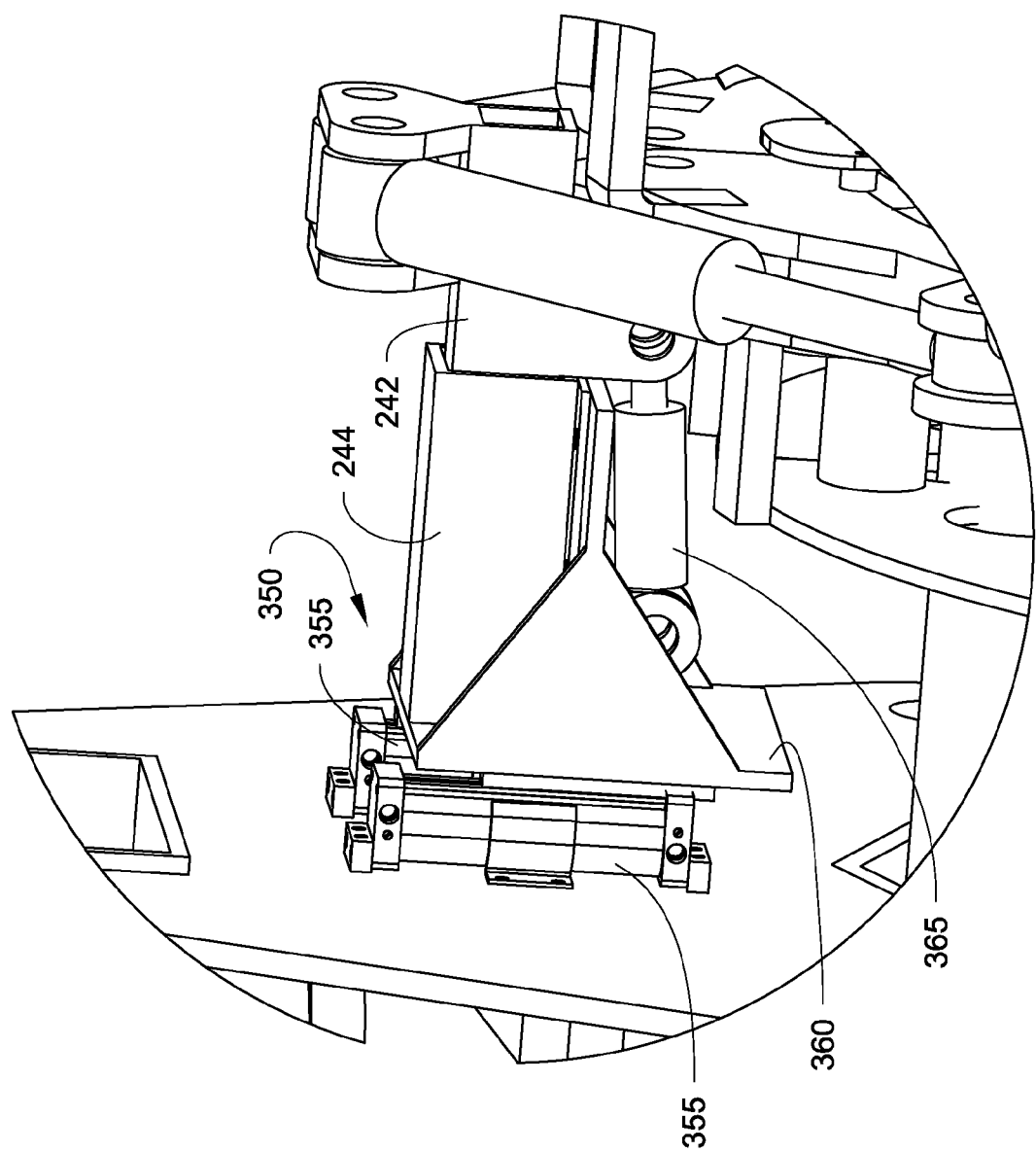

FIG. 19 illustrates a zoomed in view of the mounting mechanism shown in FIGS. 18A and 18B.

Figure 20:
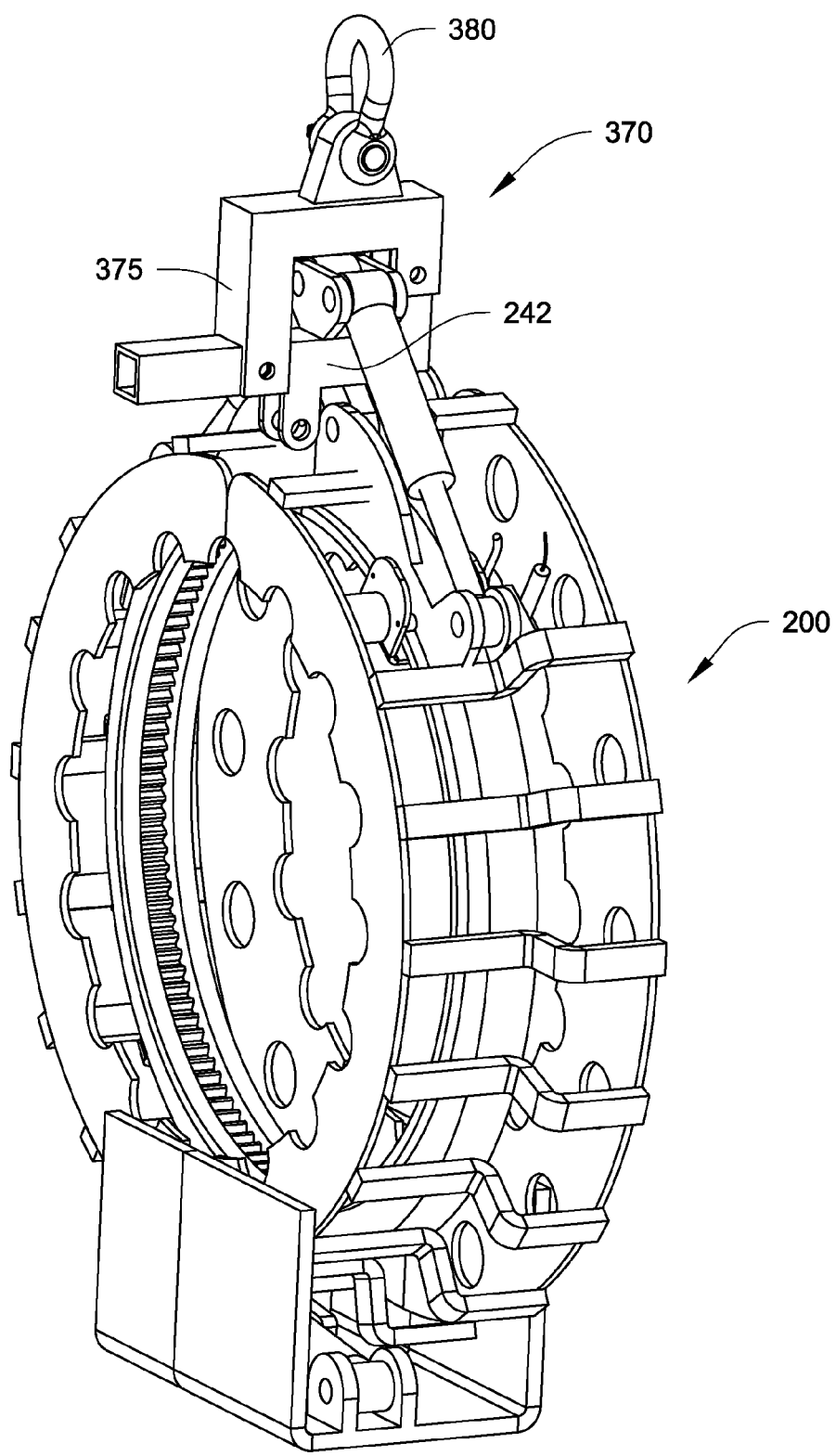

FIG. 20 illustrates an isometric perspective view of the pipe processing tool utilizing a third embodiment of a mounting mechanism.

DETAILED DESCRIPTION

Figure 1:
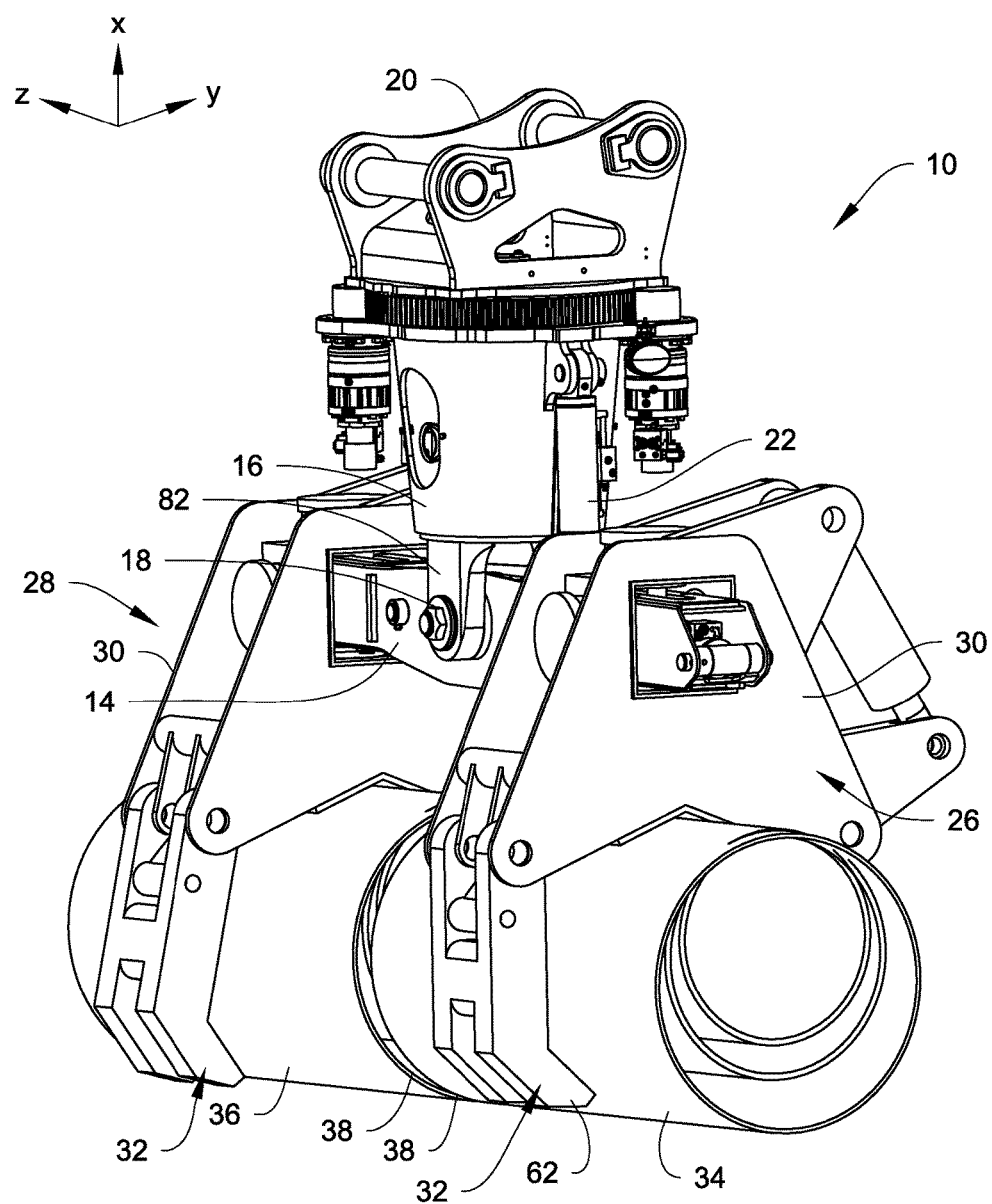
FIG. 1 is an isometric perspective view of the attachment for mounting to an of a piece of construction equipment.
Figure 2:
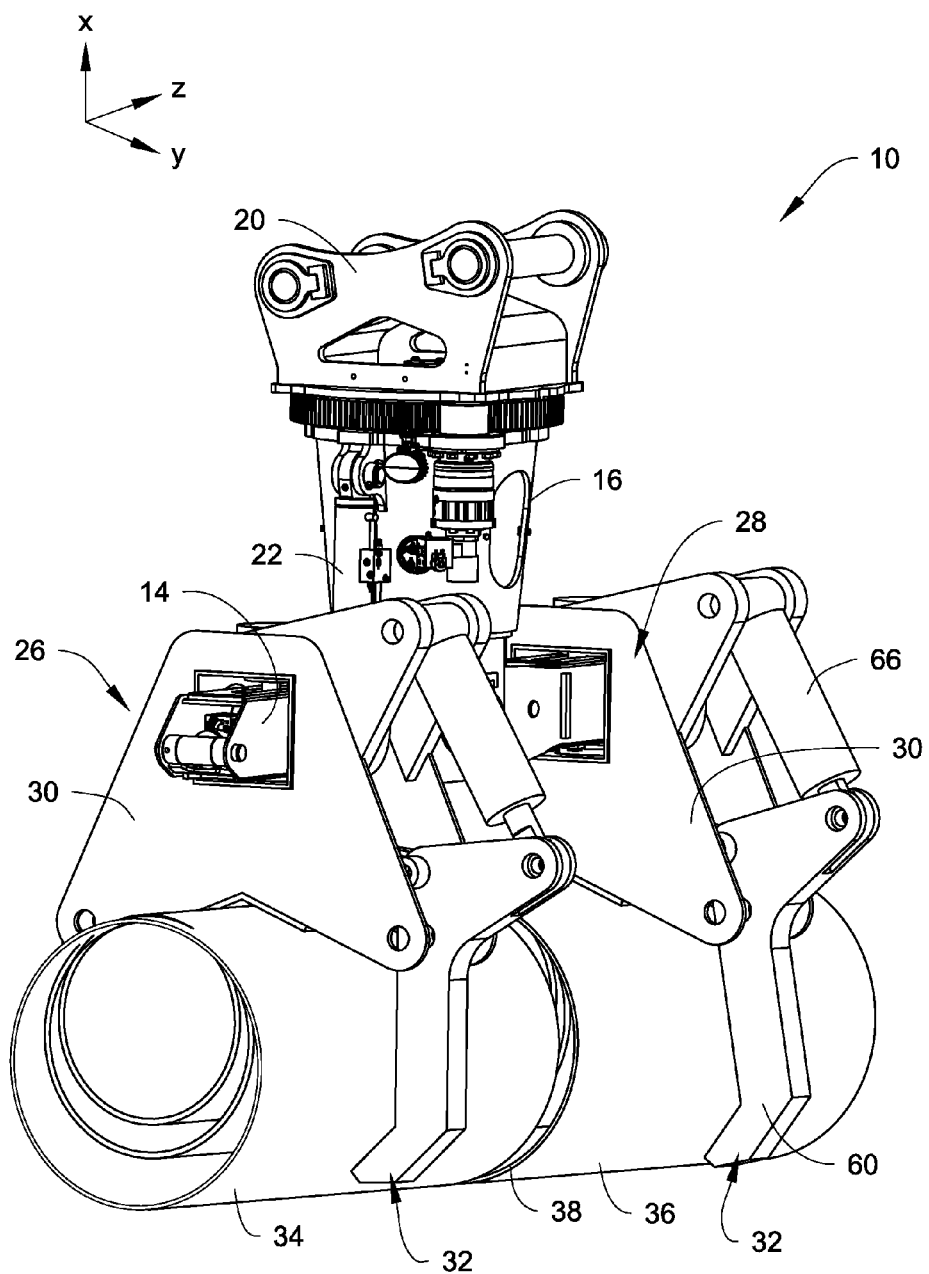
FIG. 2 is another isometric perspective view of the attachment.
Figure 3:
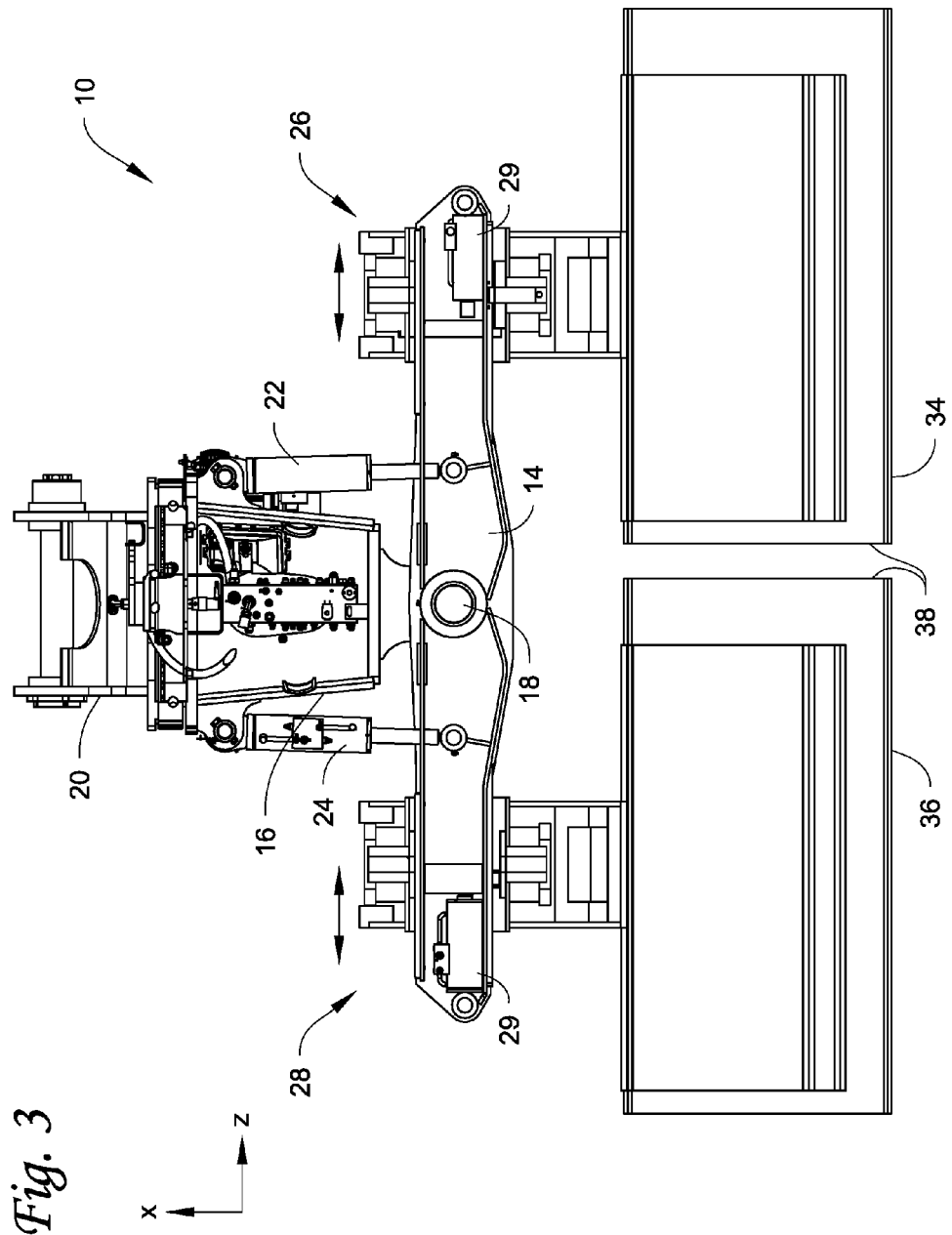
FIG. 3 is a cross-sectional side plan view of the attachment.

With reference to FIGS. 1-3, an attachment 10 is illustrated that is configured to align pipe ends during pipe tie-in. The attachment 10 is mounted to an arm of a piece of construction equipment (not illustrated). The attachment 10 includes a main beam 14 that is pivotally connected to the base of a lower head assembly 16 by a pivot 18. The lower head assembly 16 is rotatably connected to a mount bracket 20 to permit the lower head assembly 16 to rotate or swivel 360 degrees relative to the mount bracket about a vertical axis. The mount bracket 20 detachably mounts the attachment to the arm of the construction equipment. Tilt actuators 22, 24 extend between the lower head assembly 16 and the main beam 14 to selectively tilt the main beam about the pivot 18. Further information on the construction and operation of a main beam, lower head assembly, mount bracket and the tilt actuators can be found in US 2009/0057019 and US 2010/0308609, which are incorporated herein by reference in their entireties.

The attachment 10 includes a pair of grapple mechanisms 26, 28 mounted on the main beam 14. With reference to FIG. 3, the grapple mechanisms 26, 28 are mounted on the main beam so that each grapple mechanism is individually adjustable relative to the main beam along the length of the main beam in the z-axis direction as shown by the arrows in FIG. 3. Adjustment of each grapple mechanism 26, 28 is achieved by shift cylinders 29 which are illustrated as being disposed within the main beam, and which are fixed at one end to the main beam and fixed at an opposite end to the grapple mechanisms 26, 28. If desired, the shift cylinders 29 can be located outside of the main beam. Further information on shifting grapple mechanisms on a main beam is described in US 2010/0308609.

The spacing between the grapple mechanisms 26, 28 is sufficient to leave room for a pipe processing tool, for example a welding apparatus or other pipe fastening apparatus to be applied to the pipes for physically connecting the pipe ends. Details of an exemplary pipe processing tool are described below with respect to FIGS. 13-20.

The grapple mechanism 26, 28 are identical in construction. Each grapple mechanism includes a grab arm housing 30 and grab arms 32 connected to the grab arm housing.

As shown in FIGS. 1-3, each grapple mechanism 26, 28 is designed to pick up an end of a pipe 34, 36 using the grab arms 32 under the power of the construction equipment. The positions of the grab arm housings are then adjusted in the x, y and/or z-axis directions as necessary to align the pipe ends 38 during pipe tie-in. The aligned ends can then be welded or otherwise secured to each other. FIGS. 1-3 illustrate multiple concentric pipes of different diameters in order to indicate that the grapple mechanisms can be used to grab pipes of different diameters.

The z-axis direction is considered generally parallel to the ground, or parallel to the main beam, or parallel to the pipes, or left and right when viewing FIG. 3. The x-axis direction is an up and down vertical direction generally perpendicular to the z-axis direction and perpendicular to the main beam 14 when viewing FIG. 3. The y-axis direction is a forward and rearward direction generally perpendicular to the z-axis direction and to the x-axis direction, and perpendicular to the main beam 14 when viewing FIG. 3, and into and out of the page when viewing FIG. 3.

The attachment 10 can be used in the horizontal orientation illustrated in FIG. 1 with horizontal pipe and with the main beam 14 oriented generally parallel to the ground. The attachment 10 can also be used in a vertical orientation (not illustrated) with vertical pipes, with the main beam 14 oriented generally perpendicular to the ground. The attachment can also be used with pipes that are oriented at angles between horizontal and vertical.

Figure 4:
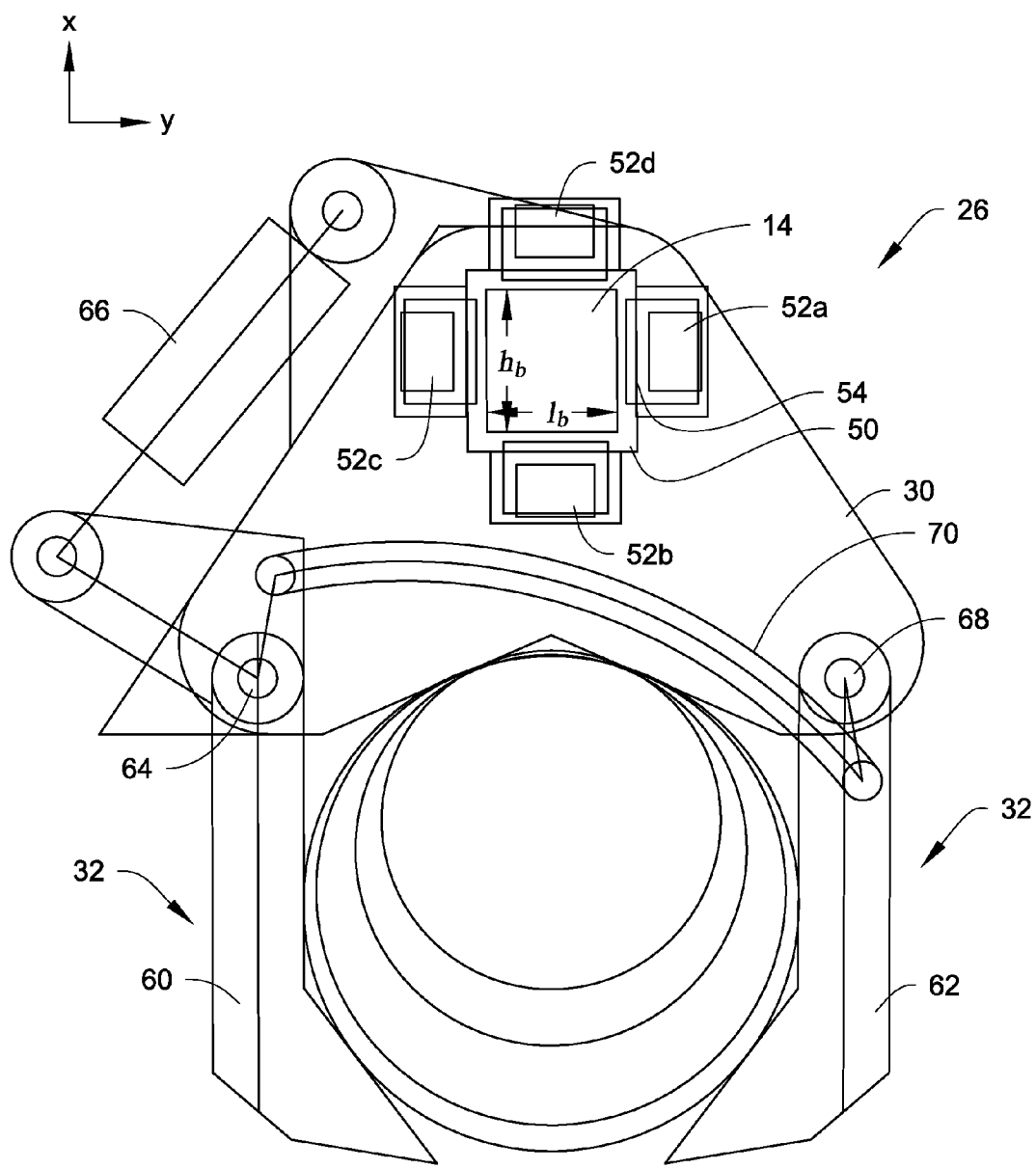
FIG. 4 is an end plan view of one of the grapple mechanisms mounted on the main beam.
Figure 5:
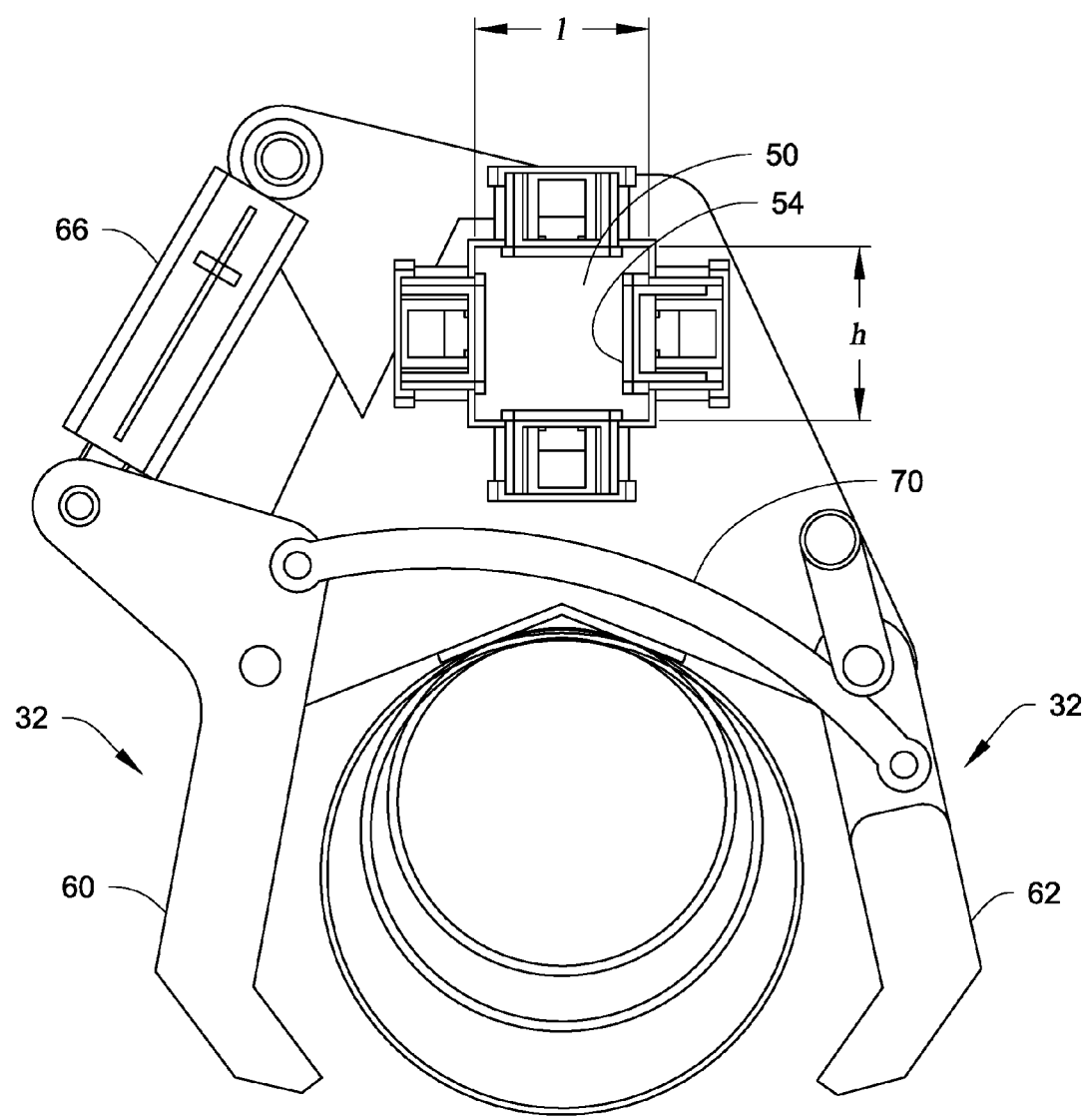
FIG. 5 is a cross-sectional view of the grapple mechanism of FIG. 4.

FIGS. 4 and 5 illustrate details of the grapple mechanism 26. As indicated above, the grapple mechanism 28 is identical in construction to the grapple mechanism 26 so it is not described separately. The grab arm housing 30 includes a rectangular beam opening 50 having a length "l" and a height "h". The opening 50 therefore has an area (l×h) in end plan view as in FIGS. 4 and 5. The grab arm housing 30 is disposed on the main beam 14 with the main beam extending through the beam opening. The main beam 14 is also illustrated as being generally rectangular in end plan view with a length "$l_b$" and a height "$h_b$" with an area ($l_b \times h_b$).

The area of the main beam 14 in end plan view is less than the area of the opening 50 in end plan view. The area of the main beam should be sufficiently less than the area of the beam opening 50 to permit relative movements between the main beam and the beam opening in at least one, preferably at least two, directions, namely the x-axis direction and the y-axis direction, generally perpendicular to the longitudinal axis (i.e. z-axis direction) of the main beam. One factor in the difference in the areas, and thus the amount of relative movements permitted, is how much movement of the grab arm housings is expected or desired in order to achieve alignment of the pipe ends. The larger the movement required, the larger the difference in area to pet it such movement.

As shown in FIGS. 4 and 5, adjustment mechanisms 52a, 52b, 52c, 52d are used to adjust the grab arm housing 30 relative to the main beam 14. The adjustment mechanisms 52a-d are fixed to the grab arm housing 30 and extend into engagement with the main beam 14. In particular, the adjustment mechanism 52a includes a flat actuating end 54 that is extendable into engagement with the right side wall (in end plan view) of the main beam. Similarly, the adjustment mechanism 52c includes a flat actuating end 54 that is extendable into engagement with the left side wall (in end plan view) of the main beam. The adjustment mechanism 52b includes a flat actuating end 54 that is extendable into engagement with the bottom wall (in end plan view) of the main beam. The adjustment mechanism 52d includes a flat actuating end 54 that is extendable into engagement with the top wall (in end plan view) of the main beam.

In one embodiment, the adjustment mechanisms 52a-d are single acting hydraulic cylinders that provide approximately 1.5 inches of travel in their respective actuation directions. However, the adjustment mechanisms 52a-d can be any type of extendable and retractable actuating mechanism including, for example other types of hydraulic or pneumatic cylinders or electrically operated screw drives.

The flat actuating ends 54 can be formed by replaceable wear pads, for example a plastic material such as NYLATRON.

To move the grab arm housing 30 to the right in FIGS. 4 and 5 in the y-direction, the adjustment mechanism 52a is actuated to extend the flat actuating end 54 thereof into engagement with the right side wall of the main beam 14. At the same time, the adjustment mechanism 52c is retracted a corresponding amount. Reaction forces force the grab arm housing 30 to move to the right relative to the main beam.

To move the grab arm housing 30 to the left in FIGS. 4 and 5, the adjustment mechanism 52c is actuated to extend the flat actuating end 54 thereof into engagement with the left side wall of the main beam 14. At the same time, the adjustment mechanism 52a is retracted a corresponding amount. Reaction forces force the grab arm housing 30 to move to the left relative to the main beam.

To adjust the vertical height of the grab arm housing 30, the adjustment mechanism 52d is actuated to extend the flat actuating end 54 thereof into engagement with the top wall of the main beam 14. Reaction forces force the grab arm housing 30 to move upward relative to the main beam in the x-axis direction. Extension of the flat actuating end 54 of the adjustment mechanism 52b into engagement with the bottom wall of the main beam 14, while the adjustment mechanism 52d is retracted, forces the grab arm housing 30 to move downward relative to the main beam in the x-axis direction. Alternatively, the adjustment mechanism 52b could be eliminated and vertical adjustment both upward and downward can be controlled by the adjustment mechanism 52d, where retraction of the adjustment mechanism 52d permits the grab arm housing to be vertically lowered under the force of gravity.

In the embodiment illustrated in FIGS. 4 and 5, the grab arm housing is adjustable relative to the main beam in left and right (y-axis directions) and up and down (x-axis directions). However, the grab arm housing need not be adjustable in all of the illustrated directions. Instead, it is contemplated herein that the grab arm housing 30 could be adjustable in just a left-right direction, or in an up-down direction.

In addition, although the main beam and the beam opening 50 are described as being rectangular, shapes other than rectangular are possible such as round or triangular. In addition, the main beam and the beam opening 50 need not have the same shape. For example, the main beam could be round in cross-sectional view and the beam opening could be rectangular.

With continued reference to FIGS. 4 and 5, the grab arms 32 are mounted to the grab arm housing. Two sets of grabs arms are provided which are disposed on opposite sides of the grab arm housing. The first set of grab arms includes a single tine 60 that is suitably configured to engage the pipe. The second set of grab arms includes a pair of spaced tines 62 (see FIG. 1) also suitably configured to engage the pipe. Further information on suitable configurations of grab arms for engaging pipe is disclosed in US 2009/0057019 and US 2010/0308609. The number of tines described herein is exemplary only. Any number of tines and configurations of tines could be used as long as the grab arms are able to grab the pipe and perform any other function of the grab arms.

The tine 60 is rotatably mounted to the grab arm housing by a pivot 64 between the ends of the tine 60. The upper end of the tine 60 is connected to an end of an actuating cylinder 66, for example a hydraulic cylinder, shown diagrammatically. The opposite end of the actuating cylinder 66 is fixed to the grab arm housing 30. The tines 62 are rotatably mounted to the grab arm housing by a pivot 68. A timing link 70 extends between the tine 60 and the tines 62. The tines are arranged in a longitudinally offset manner such that the tine 60 is positioned between the tines 62.

Figure 7:
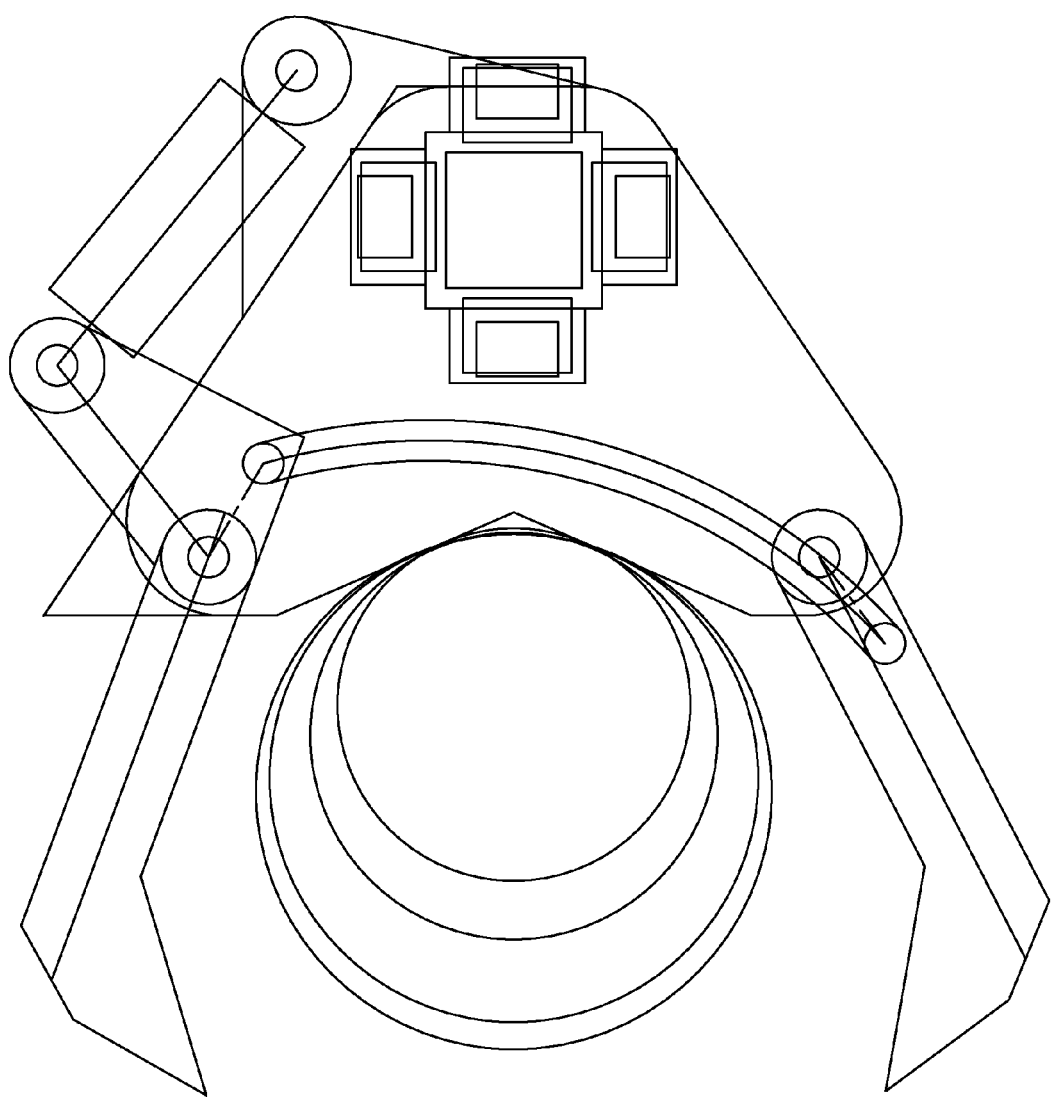
FIG. 7 is an end plan view that shows the grab arms actuated to an open position.

The tines 60, 62 are actuatable between a closed position gripping the pipe (shown in FIGS. 1-4) and an open position (shown in FIGS. 5 and 7) to permit the grapple mechanisms to be disposed over the respective pipes 34, 36. Extension of the actuating cylinder 66 pivots the tine 60 inwardly toward the closed position. At the same time, the timing link 70 connected to the tines 62 actuates the tines 62 inwardly toward the closed position. Conversely, retraction of the actuating cylinder 66 pivots the tine 60 outwardly toward the open position, with the timing link 70 simultaneously actuating the tines 62 outwardly as well.

In an alternative embodiment, an actuating cylinder can be provided to actuate each set of tines 60, 62. Also, one of the tines could be fixed while only the other set of tines is actuated.

Figure 6:
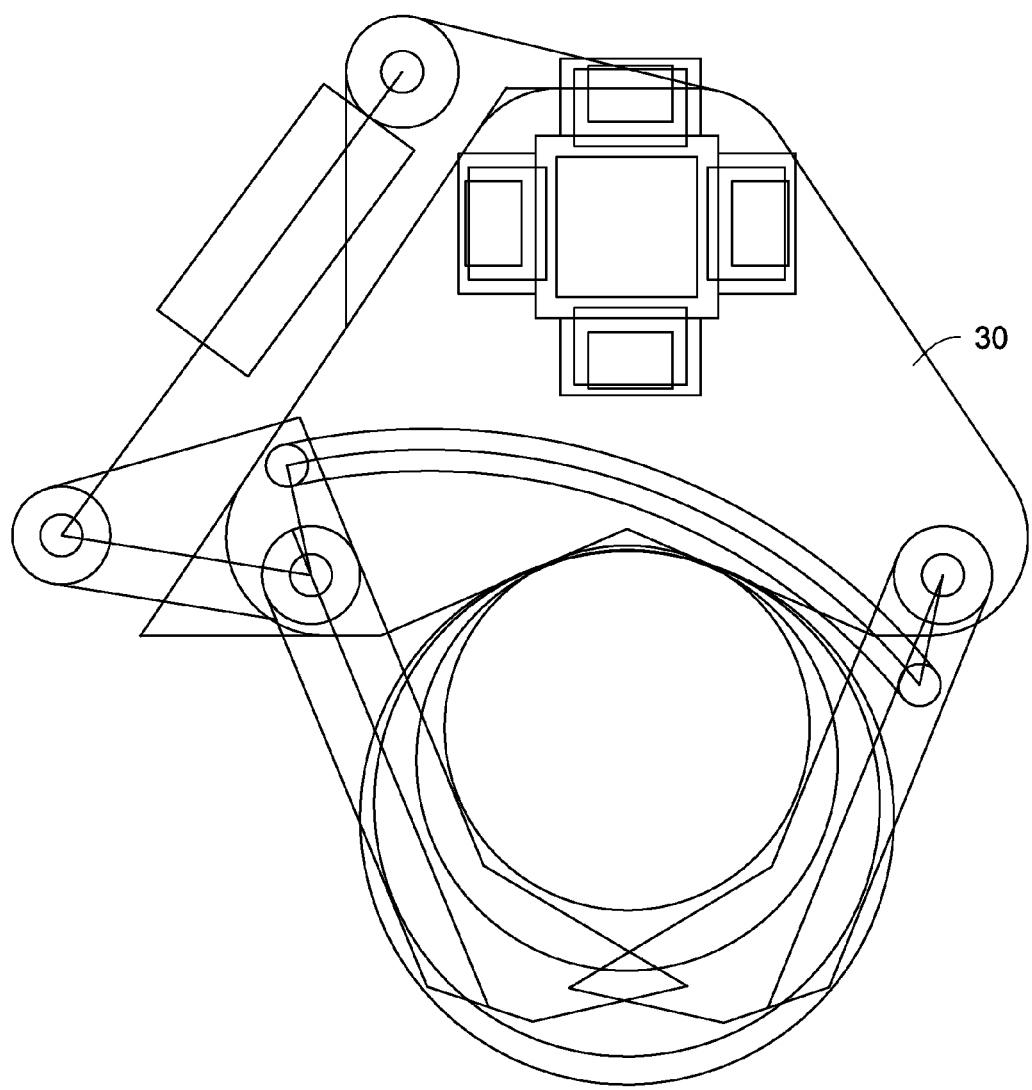
FIG. 6 is an end plan view showing the grab arms actuated to grab a small diameter pipe.

The grapple mechanisms 26, 28 can be designed for use with any size, i.e. diameter, and shape of pipe. For example, it is believed that the grapple mechanisms 26, 28 would be suitable for round pipes between about 26 inches to about 38 inches in diameter. FIG. 4 shows the grapple mechanism grabbing a 38 inch pipe while FIG. 6 shows the grapple mechanism grabbing a 26 inch pipe. However, the grapple mechanisms can be used with pipe having other diameters. Further, as indicated above, different diameters of pipe have been shown in the drawings to make it clear that the grapple mechanisms can be used with different pipe diameters.

In use, after the pipes 34, 36 have been cut and the ends 38 roughly positioned near each other, the attachment 10 is brought by the arm of the construction equipment into position near the ends 38 of the two pipes 34, 36. If necessary, the main beam 14 is tilted and/or rotated by the lower head assembly 16 and the tilt actuators 22, 24 to properly align the attachment with the pipe ends. Preferably, the pipe ends 38 are positioned approximately midway between the two grapple mechanisms as shown in FIG. 1.

The attachment is then lowered into position so that the grapple mechanism 26 surrounds the pipe 34 and the grapple mechanism 28 surrounds the pipe 36 as shown in FIG. 5. The grab arms are then actuated to bring the tines 60, 62 to the closed position shown in FIGS. 1-4 so as to grab the pipes 34, 36.

If necessary, the positions of one or both of the grapple mechanisms 26, 28 along the main beam are adjusted in the z-axis direction to bring the pipe ends closer to each other. The operator then actuates the various adjustment mechanisms 52a-d as needed to fine adjust the positions of the grab arm housings. Because the tines 60, 62 are gripping the pipes, and the tines are fixed to the grab arm housings, the pipe ends move with the grab arm housings. Thus, the adjustment mechanisms 52a-d can be used to fine adjust the positions of the pipe ends to achieve alignment.

Alignment can be achieved visually by the operator visually inspecting the relative positions between the pipes, and then adjusting the pipe positions as necessary until alignment is achieved. Alternatively, as discussed further below, an automatic guidance or alignment system can be employed. In addition, alignment can be achieved using a combination of visual and automatic guidance, with the operator roughly aligning the pipe ends visually and once rough alignment is achieved, using the automatic guidance system to finish the alignment process.

FIGS. 8A-C illustrate various types of misalignment between the pipe ends that can occur. In FIG. 8A, there is an angular and offset misalignment between the ends along one or two axes. In FIG. 8B, the pipe ends are parallel but offset in one or two axes. In FIG. 8C, there is angular misalignment. The described attachment can be used to correct these and other misalignments between the pipe ends.

In an embodiment, an automatic guidance or alignment system can be employed to automatically align the two pipe ends to each other. The guidance system can be any type of system that would be suitable to align pipe ends. For example, the guidance system can utilize contact-type position sensors or non-contact type position sensors. Examples of contact type sensors include, but are not necessarily limited to, Linear Variable Differential Transformers (LVDT) or Rotary Variable Differential Transformers (RVDT). Non-contact type sensors include, but are not necessarily limited to, one or more lasers.

FIG. 9 illustrates a guidance system that uses a single laser 80. The laser 80 is a line laser that can be fixed to or mounted on a suitable location of the lower head assembly 16, for example on the flange 82 that receives the pivot 18 (see FIG. 1). The laser 80 is mounted on a linear actuator 84 that is moveable in the z-axis direction, and a linear position feedback 86 provides information on the linear location of the laser. The linear actuator 84 moves the laser 80 across the two pipes 36, 38. The line laser 80 shoots a line that captures a portion of the 3-dimensional curvature of the pipes. In use, the line laser 80 captures the curvature profile of the pipe 36 as the laser is moved in the z-axis direction, and the data there is translated into pipe position. The laser then moves across to the pipe 34 and captures the curvature profile of the pipe 34 as the laser is moved in the z-axis direction, and the data there is translated into pipe position. The pipe positions are then compared and the pipes are adjusted using the grapple mechanisms 26, 28. This process can be repeated as necessary until the captured pipe positions match, thereby indicating alignment of the pipes.

FIGS. 10A-B illustrate a guidance system that uses four lasers 90*a-d*. The lasers 90*a, b* and 90*c, d* are mounted at the 12 o'clock and 3 o'clock positions relative to the pipe ends 18. The lasers 90*a*, 90*c* can be fixed to or mounted on a suitable location of the lower head assembly 16, for example on the flange 82 that receives the pivot 18 (see FIG. 1). The lasers 90*b*, 90*d* can be mounted to a suitable mounting bracket that is fixed to the flange 82 or other location on to the lower head assembly 16. The lasers 90*a*, 90*b* measure the distances to the pipe 36 while the lasers 90*c*, 90*d* measure the distances the pipe 34. The distances are then compared. When the difference is zero, the pipes are aligned on the respective axis. Any differences in the distances are corrected by adjusting the pipe ends using the grapple mechanisms 26, 28.

FIG. 11 illustrates a guidance system that employs four LVDT's 100*a-d* in place of the lasers 90*a-d*. The LVDT's would provide a contact type sensing approach instead of the non-contact sensing of lasers.

FIGS. 12A-B illustrate a guidance system that employs two lasers 110*a*, 110*b*. The lasers 110*a*, 110*b* are fixed to or mounted on a suitable location of the lower head assembly 16 at 12 o'clock (110*a*) and 3 o'clock (110*b*) positions so that they are stationary relative to the pipes and grapple mechanisms. The lasers 110*a*, 110*b* bridge the two pipes to measure the distances to the pipes 34, 36 as in FIGS. 10A-B, with the distances then being compared to achieve alignment.

Other types of guidance systems could be employed to automatically align the pipe ends.

Once the pipe ends are aligned, they can be joined together in any suitable manner. One example is welding the pipe ends to each other. Welding can be performed manually by someone on the ground using convention welding equipment. Welding could also be performed using a pipe processing tool that is mounted on the attachment 10. With reference to FIGS. 13-20, an example of a pipe processing tool is illustrated.

In addition to or separately from welding, other pipe processing operations can be performed using the pipe processing tool mounted on the attachment. Examples of other pipe processing operations includes coating one or more of the pipe ends, painting the pipes, cutting one or more of the pipes, applying a seal to seal the pipe ends, beveling one or more of the pipe ends, or sand blasting one or more of the pipe ends. Other processing operations are possible. Depending upon the processing operation, the processing operation can be performed before or after the pipe ends are aligned with each other.

FIGS. 13-19 illustrate a pipe processing tool 200 mounted on the attachment 10 using two different mounting mechanisms 300, 350, while FIG. 20 illustrates the pipe processing tool that includes a mounting mechanism 375 that is used to free hang the tool separate from the attachment 10 on any suitable equipment such as a crane, a boom arm, a cherry picker, and the like. In the illustrated embodiment, the pipe processing tool 200 is configured for welding and therefore it includes a welding unit 210 movably secured onto a generally circular track 220 having a plurality of gear teeth 224.

The welding unit 210 includes a laser 211, a proximity sensor 212, a welding lead 213 and a motorized gear 214 (see FIGS. 15 and 16) fixed to a welding base 215. The laser 211 is used as a guidance tool for the welding lead 213. The proximity sensor 212 is used to measure the position of the welding lead 213 to the pipe surface being welded. In this embodiment, the proximity sensor 212 is a spring loaded proximity sensor that includes a roller 216 that rolls along the outer surface of the pipe to be welded. In other embodiments, other types of contact type position sensors or non-contact type position sensors can be used in place of the proximity sensor 212. The motorized gear 214 is driven by a motor 217 and is in driving engagement with the circular track 220. The motorized gear 214 in conjunction with the gear teeth 224 allows the welding unit 210 to move along the entire track 220 around the circumference of the pipe.

The track 220 is configured to fit around the outer surface of the two pipes 34, 36 held by the attachment 10 that are to be welded together. The welding unit 210 and the track 220 are surrounded by a generally circular cage 225. The cage 225 includes a plurality of contact surfaces 230 along an inner circumference of the cage 225. The plurality of contact surfaces 230 provide multiple points of contact along the outer surfaces of the pipes 34, 36 to be welded together. The contact surfaces 230 provide additional support for holding the pipes 34, 36 while the welding unit 210 welds the pipe 34 to the pipe 36. The cage 225 is sized so as to allow the welding unit 210 to slide along the track 220 without interference from the cage 225.

The pipe processing tool 200 also includes a mounting unit 240 for mounting the pipe processing tool 200 to the attachment 10. The mounting unit 240 includes an attachment support 242 and a receiver housing 244. The receiver housing 244 receives the attachment support 242 and is secured to a mounting mechanism, such as the mounting mechanism 300 shown in FIG. 13 and the mounting mechanism 350 shown in FIGS. 18A, 18B and 19.

As shown in FIG. 14, the track 220 is made up of two generally half circular tracks 222*a*, 222*b* and the cage 225 is made up of two generally half circular shaped cages 227*a*, 227*b*. The cage 227*a* is secured to the cage 227*b* at a top end by the attachment support 242.

The pipe processing tool 200 also includes a pair of linear actuators 246*a*, 246*b*. A first end of the linear actuators 246*a*, 246*b* are fixed to the attachment support 242. A second end of the linear actuators 246*a*, 246*b* are fixed to a portion of the cages 227*a*, 227*b*, respectively. In one embodiment, the linear actuators 246*a*, 246*b* are double acting hydraulic cylinders. However, the linear actuators 246*a*, 246*b* can be any type of extendable and retractable actuating mechanism including, for example other types of hydraulic or pneumatic cylinders or electrically operated screw drives.

A bottom end of the cage 227*a* includes a first latch housing 248 and a bottom end of the cage 227*b* includes a second latch housing 249. A latching unit 250 is fixed to the first latch housing 248 and is configured to latch the first latch housing 248 to the second latch housing 249, thereby connecting the bottom end of the cage 227*a* to the bottom end of the cage 227*b*. The latching unit 250 causes the pipe processing tool 200 to provide a clamping force to clamp and to properly align the ends of the pipes 34, 36 so as to be concentric for pipe processing.

As shown in FIGS. 14 and 16, the latching unit 250 includes a latch linear actuator 251 that is pivotally fixed at one end to a latch mount 256 in the first latch housing 248. A generally hook shaped latch head 252 is pivotally fixed to a second end of the latch linear actuator 251. The latching unit 250 also includes a latch flap 254 that is pivotally fixed to an end of the latch head 252 where the latch head 252 is pivotally fixed to the latch linear actuator 251.

When clamping the first latch housing 248 to the second latch housing 249, the latch linear actuator 251 extends the latch head 252 so as to ride over the top of a latch catch 258 on the second latch housing. The latch linear actuator 251 then retracts, thereby pulling the latch head 252 into the latch catch 258 and clamping the first latch housing 248 to the second latch housing 249. This causes the pipe processing tool 200 to clamp the pipes 34, 36 concentrically to each other.

When unclamping the first latch housing 248 from the second latch housing 249, the latch linear actuator 251 extends the latch head 252, causing the latch flap 254 to extend beyond and ride over the top of the latch catch 258. The latch linear actuator 251 is then retracted so that the latch flap 254 pivots, causing the latch head 252 to ride over the latch catch 258 instead of pulling the latch head 252 into the latch catch 258.

FIGS. 13 and 17 illustrate the pipe processing tool 200 mounted on the main beam 14 via a mounting mechanism 300 according to one embodiment. The mounting mechanism 300 includes a pair of pins 305 mounted onto the main beam 14, a pair of scissor hinge mechanisms 310 and a longitudinal track 315. Each of the scissor hinge mechanisms 310 are mounted to a respective one of the pins 305. The longitudinal track 315 includes a plurality of gear teeth 317 and is connected at opposing ends to each of the scissor hinge mechanisms 310 and extends in a direction generally parallel to the main beam 14. The receiver housing 244 of the pipe processing tool 200 is movably attached to the longitudinal track 315.

In this embodiment, a motor 320 and a gear 322 are fixed to the receiver housing 244 of the pipe processing tool 200. The motor 320 and the gear 322 in conjunction with the gear teeth 317 allow the receiver housing 244, and therefore the pipe processing tool 200, to move along the track 315. Thus, the position of the pipe processing tool 200 can be altered, with respect to the attachment 10, in a direction generally parallel to the main beam 14 along the z-axis.

Both of the scissor hinge mechanisms 310 are identical in construction. Each scissor hinge mechanism 310 includes a top hinge 312a that pivots about a top pivot 311a and a bottom hinge 312b that pivots about a bottom pivot 311b. Opposing ends of the top hinge 312a are connected to the respective opposing ends of the bottom hinge 312b. In this embodiment, a rod 313 and a motor 314 are connected to the opposing ends of the top hinge 312a and the bottom hinge 312b and allow the top hinge 312a and the bottom hinge 312b to pivot about the top pivot 311a and the bottom pivot 311b. The motor 314 controls the angle of the top hinge 312a about the top pivot 311a and the angle of the bottom hinge 312b about the bottom pivot 311b, thereby controlling the position of the track 315 with respect to the attachment 10 in a generally vertical direction along the x-axis. Thus, the scissor hinge mechanisms 310 are capable of altering the position of the pipe processing tool 200, with respect to the attachment 10, in a generally vertical direction along the x-axis. In other embodiments, the rod 313 and the motor 314 can be positioned at other positions on the scissor hinge mechanism 310. For example, in another embodiment, the rod 313 can be positioned at the top pivot 311a and the motor 314 can be positioned at the bottom pivot 311b. In other embodiments, a motor or rod can be connected at the opposing ends of the top hinge 312a and the bottom hinge 312b as well as the top pivot 311a and the bottom pivot 311b.

In some embodiments, the mounting mechanism 300 is capable of also altering the position of the pipe processing tool 200 with respect to the attachment 10 in a direction generally perpendicular to the x-axis direction and the z-axis direction.

Electrical power for the welding unit 210 and the motors 314, 320 and hydraulic power for the actuators 246a, 246b, 251 are provided by way of suitable connections to sources on the head assembly 16 or other suitable sources external to the tool 200.

The configuration of the tool 200 allows other pipe processing units that perform other processing operations to be mounted to the tool 200. For example, the welding unit 210 can be replaced with a spray coating mechanism that can ride on the track 220 for applying a coating around the ends of the pipes at or near the joint. Of course, as indicated above, other pipe processing operations could be performed using suitably configured units.

FIGS. 18A, 18B and 19 illustrate the pipe processing tool 200 mounted on one of the grab arm housings 30 via a mounting mechanism 350, according to another embodiment. The mounting mechanism 350 includes a pair of linear actuating slide mounts 355 mounted onto a side surface of the grab arm housing 30, a receiver base 360 and a linear actuator 365. The receiver base 360 is attached to the receiver housing 244 of the pipe processing tool 200. The linear actuator 365 is pivotally attached at one end to the receiver base 360 and is pivotally attached at the other end to the attachment support 242 of the pipe processing tool 200.

In one embodiment, the linear actuator 365 is a double acting hydraulic cylinder. However, the linear actuator 365 can be any type of extendable and retractable actuating mechanism including, for example other types of hydraulic or pneumatic cylinders or electrically operated screw drives.

The receiver base 360 is movably mounted to the pair of linear actuating slide mounts 355, such that the receiver base 360 is capable of moving, with respect to the attachment 10, in a generally vertical direction along the x-axis. Thus, the mounting mechanism 350 is capable of altering the position of the pipe processing tool 200 with respect to the attachment 10 in a generally vertical direction along the x-axis. In some embodiments, the receiver base 360 position is controlled by the linear slide mounts 355.

In this embodiment, the attachment support 242 is movably secured to the receiver housing 244, such that the attachment support 242 can slide into and out of the receiver housing 244 in a direction generally parallel to the main beam 14 along the z-axis. The linear actuator 365 allows a user to adjust the position of the attachment support 242 within the receiver housing 244 in a direction generally parallel to the main beam 14 along the z-axis. By adjusting the linear actuator 365, the attachment support 242 is capable of moving with respect to the attachment 10 in a direction generally parallel to the main beam 14 along the z-axis. Thus, the mounting mechanism 350 is capable of altering the position of the pipe processing tool 200 with respect to the attachment 10 in a direction generally parallel to the main beam 14 along the z-axis.

In some embodiments, the mounting mechanism 350 is capable of also altering the position of the pipe processing tool 200 with respect to the attachment 10 in a direction generally perpendicular to the x-axis direction and the z-axis direction.

FIG. 20 illustrates the pipe processing tool 200 secured to a mounting mechanism 370 according to yet another embodiment. The mounting mechanism 370 includes a bracket 375 that secures the attachment support 242 of the pipe processing tool 200. The mounting mechanism 370 also includes a clevis 380 pivotally mounted to the top of the bracket 375. The clevis 380 allows the mounting mechanism 370, and thereby the pipe tool 200, to freely suspend from an attachment, such as the attachment 10 shown in FIG. 1. Alternatively, the pipe processing tool 200 can be freely hung using a chain or cable attached to a general lifting machine, for example a crane, boom arm, loader, cherry picker, etc. In one such embodiment, a crane cable can be attached to the clevis 380 and through the use of a remote power source (not shown) operate the pipe processing tool 200 to perform all of the before described activities. Thus, in the embodiment of FIG. 20, the processing tool 200 can be used separately from, i.e. not attached to, the attachment 10.

The illustrated pipe processing tool and associated mounting mechanisms are exemplary only. Any pipe processing tool and associated mounting mechanism that can be incorporated onto the attachment 10 to perform a pipe processing operation on one or more of the pipes can be used.

The embodiment illustrated in FIG. 1 shows the use of one attachment, having two grapple mechanisms, mounted on the main beam 14. It is contemplated that separate attachments could be utilized, each having one or two grapple mechanisms, with each attachment being connected to arms of separate construction equipment, with one attachment grabbing and adjusting one pipe end and the other attachment grabbing and adjusting the other pipe end. Also, two grapple mechanisms could be used to grab each pipe.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A pipe processing tool configured to perform a processing operation on one or more ends of first and second cylindrical pipes to be joined together, comprising:
   two generally half circular members configured to encircle the first pipe adjacent to the end thereof, each generally half circular member includes a first end and a second end;
   a support member;
   the first end of each generally half circular member is pivotally attached to the support member;
   a latch mechanism disposed at the second ends of the generally half circular members and configured to detachably latch the second ends together to clamp the two generally half circular members on to the first pipe;
   a plurality of radially inward facing, circumferentially spaced contact surfaces along an inner circumference of each of the two generally half circular members that are configured to contact an outer surface of the first pipe; and
   a pipe processing mechanism mounted on the generally half circular members, the pipe processing mechanism is configured to perform the processing operation on one or more ends of first and second cylindrical pipes.

2. The pipe processing tool of claim 1, wherein the pipe processing mechanism comprises a welding unit.

3. The pipe processing tool of claim 1, wherein the two generally half circular members and the plurality of radially inward facing, circumferentially spaced contact surfaces clamp the end of the first pipe concentrically to the end of the second pipe.

4. The pipe processing tool of claim 1, further comprising a linear actuator connected to each of the generally half circular members to pivot the generally half circular members relative to the support member.

5. The pipe processing tool of claim 1, further comprising a mounting mechanism connected to the support member that is configured to mount the pipe processing tool to an arm of construction equipment.

6. The pipe processing tool of claim 5, wherein the mounting mechanism is configured to mount to a grapple attachment that is attachable to the arm of the construction equipment.

7. The pipe processing tool of claim 6, wherein the mounting mechanism is configured to mount to a side of a grapple mechanism of the grapple attachment.

\* \* \* \* \*